United States Patent [19]
Kannan et al.

[11] Patent Number: 5,511,205
[45] Date of Patent: Apr. 23, 1996

[54] SYSTEM FOR DISTRIBUTED POWER MANAGEMENT IN PORTABLE COMPUTERS

[75] Inventors: Krishnamurthi Kannan, Yorktown Heights, N.Y.; Christopher D. Jones, Georgetown, Ky.; Nathan J. Lee, New City, N.Y.; Kyriakos Leontiades, Boca Raton, Fla.; Frank P. Novak, Park Ridge, N.J.; Vikram Sharma, Pleasantville, N.Y.

[73] Assignee: International Business Machines Corporation, Armonk, N.Y.

[21] Appl. No.: 355,205

[22] Filed: Dec. 8, 1994

Related U.S. Application Data

[62] Division of Ser. No. 870,124, Apr. 15, 1992, Pat. No. 5,423,045.

[51] Int. Cl.⁶ .................................................. G06F 1/32
[52] U.S. Cl. ................................................... 395/750
[58] Field of Search ........................... 395/750, 183.22; 364/707

[56] References Cited

U.S. PATENT DOCUMENTS

| | | | |
|---|---|---|---|
| 4,317,181 | 2/1982 | Teza et al. | 364/707 |
| 4,612,418 | 9/1986 | Takeda et al. | 364/707 |
| 4,615,005 | 9/1986 | Maejima et al. | 364/707 |
| 4,698,748 | 10/1987 | Juzswik et al. | 395/200 |
| 4,747,041 | 5/1988 | Engel et al. | 364/707 |
| 4,780,843 | 10/1988 | Tietjen | 364/707 |
| 4,823,292 | 4/1989 | Hillion | 364/707 |
| 4,851,987 | 7/1989 | Day | 395/550 |
| 4,914,576 | 4/1990 | Zelley et al. | 364/200 |
| 4,980,836 | 12/1990 | Carter et al. | 364/483 |
| 5,019,996 | 5/1991 | Lee | 364/550 |
| 5,041,964 | 8/1991 | Juzswik et al. | 395/200 |
| 5,142,684 | 8/1992 | Perry et al. | 395/750 |
| 5,167,024 | 11/1992 | Smith et al. | 395/375 |
| 5,182,810 | 1/1993 | Baytling et al. | 395/750 |
| 5,220,671 | 6/1993 | Yamagishi | 395/750 |
| 5,230,055 | 7/1993 | Katz et al. | 395/750 |

(List continued on next page.)

FOREIGN PATENT DOCUMENTS

| | | |
|---|---|---|
| 0033007 | 8/1981 | European Pat. Off. |
| 0404182 | 12/1990 | European Pat. Off. |
| 2235797 | 3/1994 | United Kingdom . |
| WO91/00566 | 1/1991 | WIPO . |

OTHER PUBLICATIONS

Mel Gable; Woolsich, London; *Designing A Laptop Computer With Power Management Features*, Electronic Engineering, Jul. 1990, No. 763; pp. 43 and 45–46.

Eaton, John E., et al., Amstelveen, Netherlands; *Design of HP's Portable Computer Family*, Hewlett–Packard Journal, Jul. 1986, No. 7; pp. 4–13.

Intel Corp., 386 Microprocessor Superset, System Design Guide, 1990.

*Primary Examiner*—Jack B. Harvey
*Assistant Examiner*—Glenn A. Auve
*Attorney, Agent, or Firm*—Sterne, Kessler, Goldstein & Fox

[57] ABSTRACT

A system and method for managing power in a portable, pen-based notebook computer. The system and method provides for minimizing power consumption by collecting and interpreting power related data of various processing elements while hiding many of the details from the end-user. The system monitors, collects, and acts upon power-related data in a portable computer to maximize the amount of time the portable computer can be used between battery recharging with minimal user intervention. The system has a plurality of independently controllable power planes which are selectively powered so that the portable computer consumes the minimum power necessary to perform a particular function and a plurality of central processing units (CPUs) operating asynchronously with respect to each other. The present invention is further comprised of an on/off glue logic for monitoring battery condition, user invoked functions, and system state and power management for controlling the operation of each of the CPUs as a function of the conditions sensed.

6 Claims, 25 Drawing Sheets

U.S. PATENT DOCUMENTS

| | | | |
|---|---|---|---|
| 5,239,495 | 8/1993 | Nanno et al. | 364/707 |
| 5,241,680 | 8/1993 | Cole et al. | 395/750 |
| 5,251,320 | 10/1993 | Kuzawinski et al. | 364/707 |
| 5,315,695 | 5/1994 | Saito et al. | 395/132 |
| 5,339,445 | 8/1994 | Gasztonyi | 395/750 |
| 5,339,446 | 8/1994 | Yamasaki et al. | 395/750 |
| 5,396,635 | 3/1995 | Fung | 395/800 |
| 5,423,045 | 6/1995 | Kannan et al. | 395/750 |

POWER DOWN CONTROL REGISTER (PDCR)
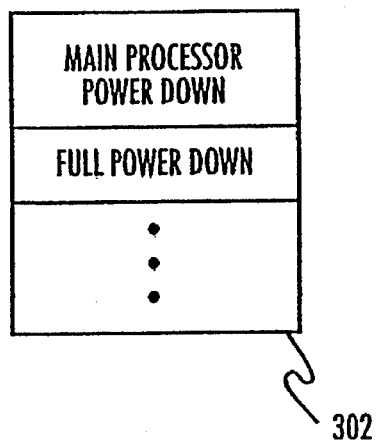
302
CPU CLOCK CONTROL REGISTER (CCCR)
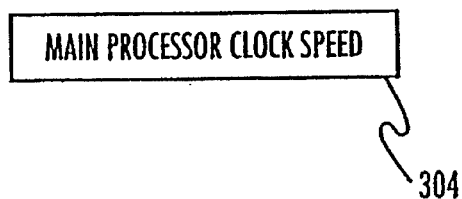
304
REFRESH CONTROL REGISTER (RCR)
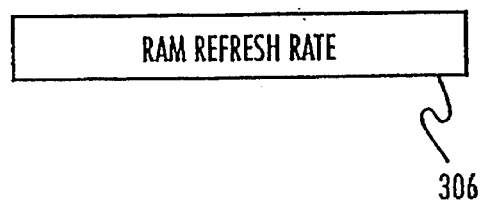
306
POWER PLANE CONTROL REGISTER (PPCR)
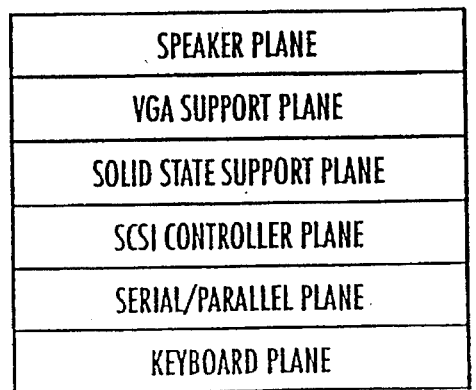
308
FIG. 3A SCREEN TIMER CONTROL REGISTERS (STCRs)

| LCD PANEL TIME |
— 310

| LCD BACKLIGHT TIME |
— 312

POWER MANAGEMENT INTERRUPT MASK REGISTER (PMIMR)

| SUSPEND PM EVENT |
| RESUME PM EVENT |
| PCUINT PM EVENT |
— 314

POWER MANAGEMENT INTERRUPT STATUS REGISTER (PMISR)

| SUSPEND PM EVENT ACTIVATED |
| RESUME PM EVENT ACTIVATED |
| PCUINT PM EVENT ACTIVATED |
— 316

POWER MANAGEMENT EVENT REGISTER (PMEVR)

|  •  |
|  •  |
|  •  |
| THIRD PM EVENT |
| SECOND PM EVENT |
| FIRST PM EVENT |
318

FIG. 3B

SYSTEM FOR DISTRIBUTED POWER MANAGEMENT IN PORTABLE COMPUTERS

The application is a Divisional, of application Ser. No. 07/870,124, filed Apr. 15, 1992, now U.S. Pat. No. 5,423,045.

TECHNICAL FIELD

This invention relates generally to computers. More specifically, this invention relates to the management of power in portable computers.

BACKGROUND ART

Reducing power consumption in portable computers has gained a great deal of attention in the technical community as a result of a set of conflicting user requirements and technological constraints. On the one hand, users would like to operate these portable machines for extended periods of time without access to ac power. This means that such machines must carry their own power sources, i.e., batteries of various types. On the other hand, the total energy stored in such batteries varies almost directly in proportion to their weight. Carrying heavy batteries of course, detracts from the portability of these machines.

Therefore, efforts in the industry have focused in several related areas. First, designing components that consume less power than corresponding components in desktop ac-powered machines; second, detecting when such components are not in use and turning them off or placing them in a lower power consuming mode(s), thus reducing their energy consumption over time; third, using batteries that provide higher energy-to-weight ratios; and last, monitoring the battery and providing the user with alerts and related actions due to the non-linear nature of battery power output as a function of time.

The power management techniques which are currently practiced in the personal computer industry commonly address a combination of one or more of these areas.

U.S. Pat. No. 5,428,790 to Harper et al. describes the design elements of the POQET computer. The POQET computer has been designed with several low power components such as a low power display element, low power Universal Asynchronous Receive Transmit (UART) component, etc. Additionally, circuitry has been designed that detects the occurrence of certain key events in the system such as the occurrence of a key press on the keyboard, system timer signal, access to a special memory location commonly known as the interrupt vector, etc. The occurrence of any of these events triggers a Non-Maskable Interrupt (NMI) to the processor which then executes a special block of power management code. This code then determines if a change in the power state of the system is warranted. There are several drawbacks to this approach. The scheme of monitoring processor access to certain interrupt vector locations and thereby deducing that the operating system and/or applications are idle, do not apply to advanced processors such as the Intel 80286/386 operating in the so-called protected mode of operation. In these processors, the location of the interrupt vectors is not fixed. As a result, the address lines external to the Central Processing Unit (CPU) cannot be monitored to determine if a particular interrupt is vectored to a particular location. Nor can they be relied upon to work correctly in multi-tasking environments such OS/2 or the more recent Penpoint operating system developed by GO. Corp. for pen-based computers. Such operating systems generally do not issue software interrupts to indicate an idle state. Furthermore, in the advanced processors cited above, the interrupt vectors themselves are not guaranteed to be at any given memory address. Thus, while the POQET design works well with real mode DOS applications, it is inadequate for environments using multi-tasking operating systems executing on processors such as Intel 80386.

U.S Pat. No. 5,041,964 to Cole et al. describes the power management hardware and software of a GRID laptop computer. In this computer, a standby mode is defined in which power to most parts of the computer except dynamic memory is removed when one of a set of pre-defined events occurs. Power is restored to the system when the user so indicates (by a push button) and there is sufficient battery power to enable proper system functioning. As in the case of the POQET computer, the solutions in this patent break down in a multitasking environment where multiple applications may be active at once as well as in advanced microprocessors, such as the Intel 80386 and compatibles, wherein the operating system can (and does) disables NMI interrupts from occurring or re-vectors them to code fragments that may have no knowledge of the nature of NMI being presented to the computer.

In the European Patent Application No. 90311832.1, Watts and Wallace describe an apparatus and a method whereby the CPU clock is reduced whenever a real-time monitor determines that CPU activity level is low. The reduced clock rate results in lower power consumption by the CPU. Such apparatus has been incorporated in highly integrated chip sets available from several chip vendors. However, Watts does not teach how to apply such techniques when multiple CPUs are involved in the operation of a computer. In fact, applying the above methods to a single microprocessor, albeit the main processor, without overt coordination among the principal points of intelligence within the system, may result in a net increase in power consumption.

In International Pat. Appln. No. PCT/US89/05576 to Bolan et al., a method whereby the power consumed by a certain microprocessor can be controlled externally by a chip is described. This chip is designed to consume very low power. As in the previous teachings, such methods and apparatus are readily available from a number of chip vendors. What is missing from the Bolan device is a description of how these mechanisms can be applied to the design of a distributed power managed computing platform such as a pen based tablet computer. Other implementations, including the IBM laptop computer (the PS/2 L40SX computer), have provided for user specifiable time-outs for various power consuming devices. When no input/output (I/O) activity is perceived for a time-out period on a given component, that component is placed in a low power state. For example, many implementations include a specifiable time out value for the hard file. At the end of the time out period, if no activity has occurred, the device is turned off. However, it must be noted that extra power is expended when the hard file is turned on again and furthermore, the CPU has to wait (wasting energy) while the spin-up is taking place. Studies have shown that no single time out value is likely to result in optimal power conservation. Thus, it is difficult if not impossible for users in general to provide appropriate timeout values for devices in such a portable system.

What is needed is a power management system which can operate effectively in multi-tasking, multiple-CPU systems and advanced processors at a reduced rate.

DISCLOSURE OF THE INVENTION

The present invention provides a system and method for managing power in a portable, pen-based notebook computer. The system and method provides a means for minimizing power consumption by collecting and interpreting power related data at various processing elements while hiding many of the details from the end-user.

Power management is carried out co-operatively at several layers. These layers include a system planar hardware level, battery controller level, service processor level, main processor firmware level, and operating system level. At the system planar level, mechanisms for low power operations are implemented. These mechanisms include partitioning of peripherals and I/O devices into power planes that can be independently turned on and off, providing software switches that control power to these planes and selection of devices that are capable of low power standby modes of operation. In the battery controller level, mechanisms are provided to turn power to the system on and off and to collect data relating to the state of the battery to send this information to the main processor. The battery controller is also responsible for protecting the battery from excessive drain or operation under low charge conditions. At the service processor level, circuits are provided to monitor the on/off button and to communicate power management events and battery state information to the main processor on the system planar. The system firmware and operating system software levels execute on the main processor on the system planar and are responsible for policy decisions such as when power planes can be shut down and what to do when a power event takes place.

FEATURES AND ADVANTAGES

It is an advantage of the present invention to distribute the power management function among three processors, thereby reducing the amount of processing time the main CPU is required to dedicate to the power management function.

It is a further advantage of the present invention not having to monitor address patterns to obtain access to certain interrupt vector locations. This enables the present invention to operate in advanced processors which have a protected mode of operation and do not follow conventional addressing standards.

It is a further advantage of the present invention to have multiple processors operating asynchronously enabling one processor to enter a low power mode of operation independent of the other processors.

It is a further advantage of the present invention to have an established communication protocol to transfer power management data between multiple processors enabling each to efficiently determine which power management functions to perform by taking the states of the other processors into consideration.

It is a further advantage of the present invention to separate the computer into independently controlled power planes enabling it to selectively power only those parts of the computer necessary to perform the present functions and without affecting the overall usability of the system.

It is a further advantage of the present invention to immediately enter a low power mode of operation whenever there are no instructions to perform.

It is a further advantage of the present invention to have a zero power state wherein the computer enters such state only after storing all application data. Having a zero power state rather than an off state enables the user to turn off the machine in the middle of running an application program without losing data. The computer will save all the necessary application data and return the computer to the same state upon turning the system on.

It is a further advantage of the present invention to have the capability to save CPU state and application data in a secondary storage medium whenever battery power is low. This reduces the need for a backup battery and thereby reduces the weight of the computer.

The foregoing and other objects, features and advantages of the invention will be apparent from the following more particular description of the preferred embodiments of the invention, as illustrated in the accompanying drawings.

BRIEF DESCRIPTION OF DRAWINGS

FIGS. 3(a) and 3(b) are block diagrams of the Core Chip Set Register Files;

BEST MODE FOR CARRYING OUT THE INVENTION

The preferred embodiment of the present invention for use in a portable, pen-based notebook computer is disclosed herein. In the preferred embodiment, the computer is logically compatible with an IBM PC/AT standard computer and has an Intel 386SX or an AMD AM386SXL main processor. It is equipped with an integrated LCD panel and digitizer and packaged to resemble a notebook with a writing surface.

Figure 1:
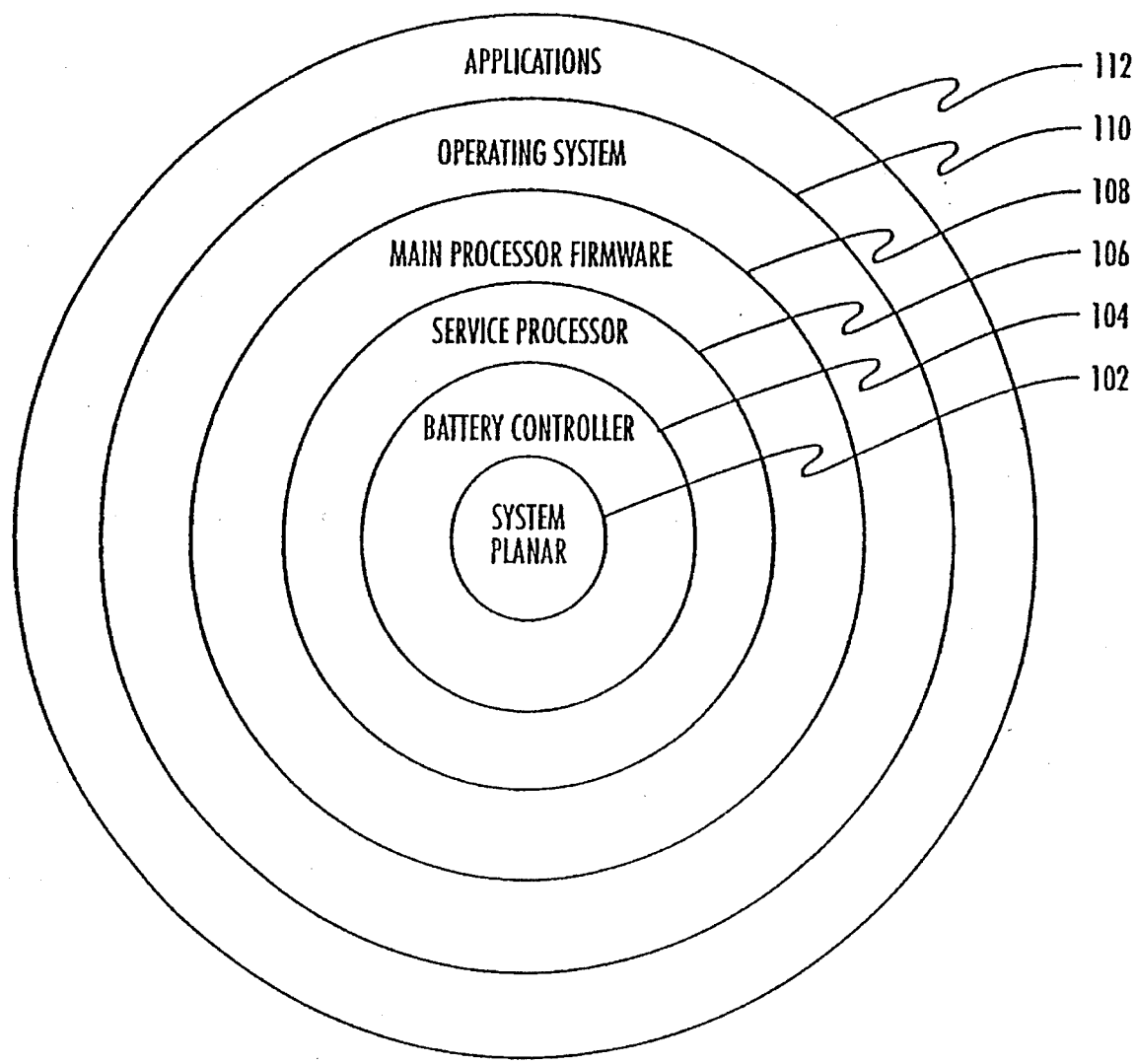
FIG. 1 is an illustration of the layering of the power management elements of the present invention.

The power management function is carried out co-operatively at several levels or layers as illustrated in FIG. 1. The most external layer, the applications layer 112, represents any software which is installed by the user and executed on the notebook computer. The functional layers of the power management system are contained within this broader applications processing layer 112. Specifically, there are five functional levels:

(1) System Planar 102

(2) Battery Controller 104

(3) Service Processor 106

(4) Main Processor Firmware 108

(5) Operating System 110

These five functional levels work in conjunction with each other to maintain the computer in one of four operational states. These are: full power or normal, low power or idle, standby or sleep, and zeropower. The present state of the system determines what functions are performed at each of the five layers.

Figure 5:
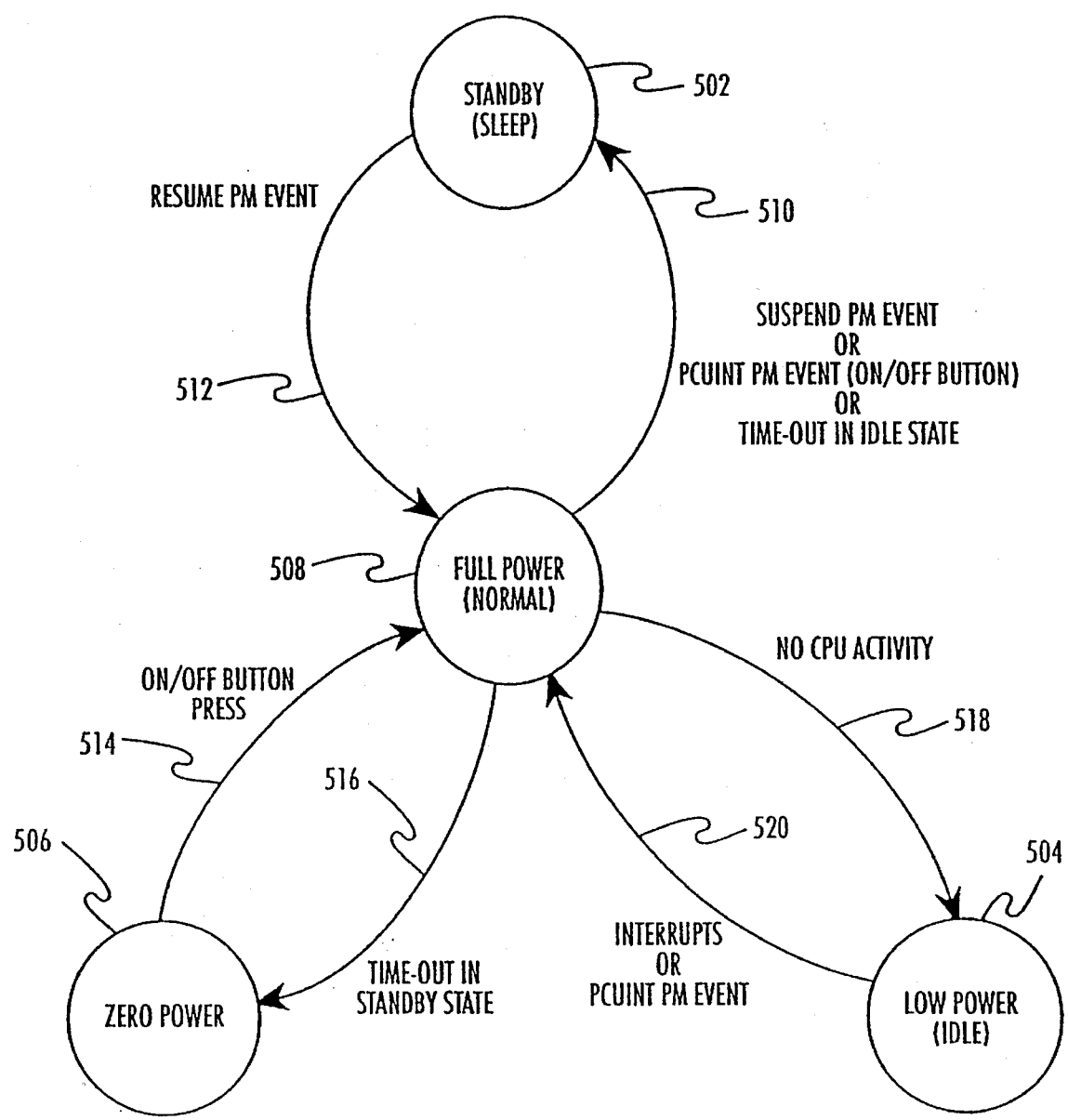
FIG. 5 is a state diagram of the main processor and system planar.

These four states are briefly described with reference to FIG. 5. Each state and transition shall be fully described in section II. The full power or normal state is the fully operational and active state. As shown in FIG. 5, every change in state must involve the normal state. In the low power or idle state the system is operational but only necessary functions are being powered. The computer appears to be ON in this state. In the standby or sleep state, the system appears to be OFF to the user, however, there are certain system components which are powered and the system will immediately resume its normal operation if requested to do so. If not, the system will automatically transition to the zero power state after a given period of time. This is the lowest power state and the computer appears to be OFF.

A brief description of the functions performed at each of the functional levels is given below.

At the System Planar Level 102, mechanisms for low power operations are implemented. These mechanisms include partitioning of peripherals and I/O devices into power planes that can be independently turned on and off, providing software switches that control power to these planes, and selecting devices that are capable of low power standby modes of operation. An example of this methodology is the selection of a Solid State File (SSF) as the storage media. The SSF consumes significantly less power while in operation (active read/write) than comparable conventional rotating magnetic media files. It also consumes lower power in non-operational modes such as the standby or sleep mode.

At the Battery Controller Level 104, mechanisms are implemented to control the system power, collect status data on the state of the battery, and transmit this information to the main processor. Also, functions which are responsible for protecting the battery from excessive drain or operation under low charge conditions operate at the Battery Controller Level 104.

At the Service Processor Level 106, circuits are provided to monitor the on/off button and to communicate power management events and battery state information to the main processor on the system planar level 102.

The System Firmware Level 108 and the Operating System Level 110 contain software which executes on the main processor which is part of the system planar level 102 and are responsible for policy decisions such as when power planes can be shut down and what to do when a power related event takes place.

The structure and operation of the preferred embodiment of the present invention will be described in terms of these layers.

I. SYSTEM PLANAR LAYER

Figure 2:
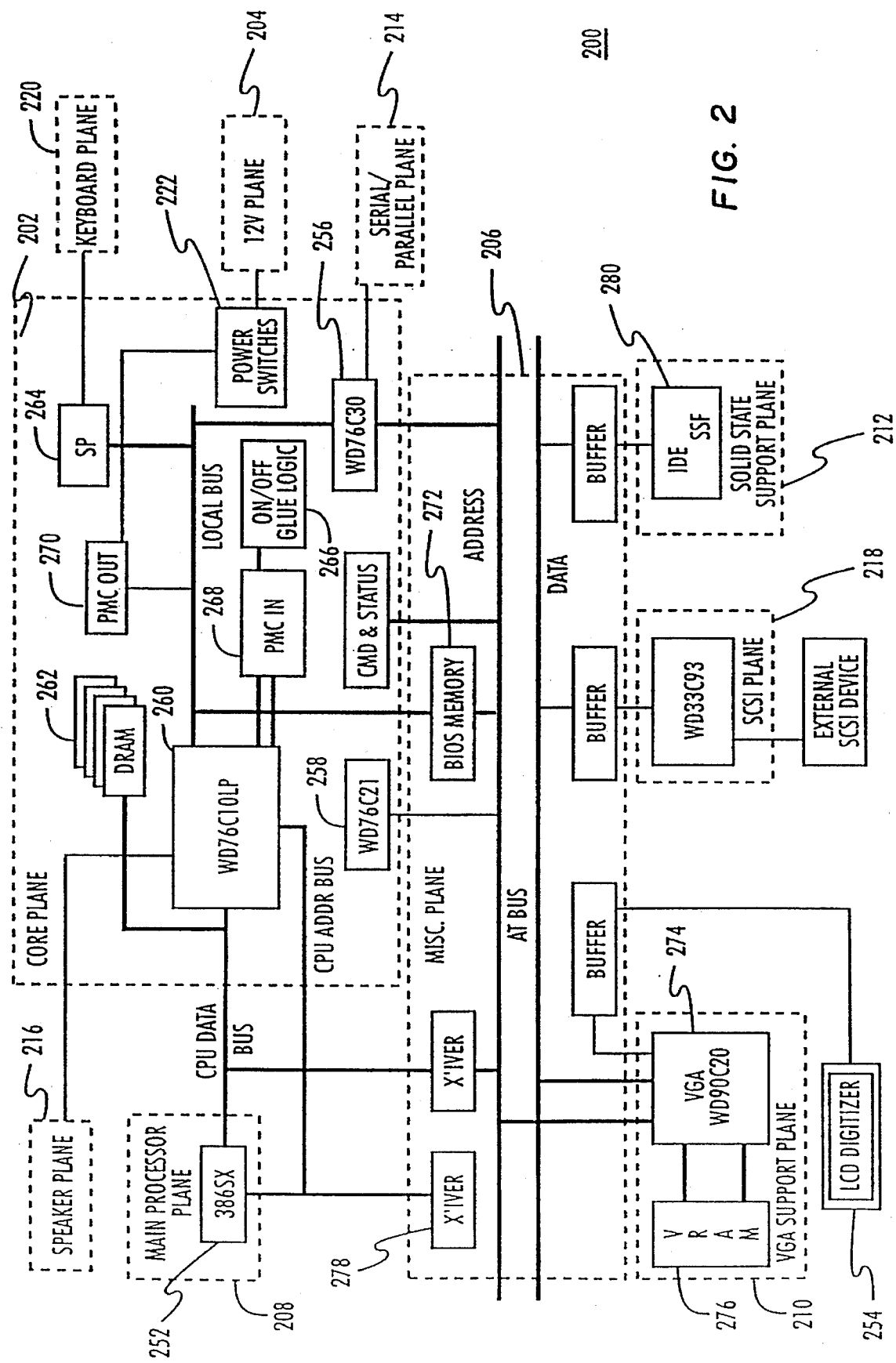
FIG. 2 is a block diagram of the System Planar Hardware Layer.

FIG. 2 is a block diagram of the system planar level 200. In the preferred embodiment, the system planar level 200 is divided into ten power planes for the purposes of managing power consumption. They are:

(1) Core Plane 202

(2) 12 Volt Plane 204

(3) Miscellaneous Plane 206

(4) Main Processor Plane 208

(5) VGA Support Plane 210

(6) Solid State Support Plane 212

(7) Serial/Parallel Plane 214

(8) Speaker Plane 216

(9) SCSI Plane 218

(10) Keyboard Plane 220

A brief description of each power plane and the conditions under which it receives power is given below with reference to FIG. 2.

1. Core Plane 202

The core plane 202 is comprised of three vendor chips 256, 258 and 260 (described in detail below) which enables the invention to be compatible with an IBM PC/AT. These chips comprise what is defined as the core chip set and perform many power control functions. Core Plane 202 is also comprised of power switching circuitry 222, up to 16M of dynamic RAM (DRAM) memory 262, a service processor 264, power management control logic (PMCIN 268 and PMCOUT 270), and on/off button glue logic 266. The core plane 202 remains powered during all power states of the system except the off state. Removal of power from this plane cannot be accomplished directly by the main processor 252. Instead, the main processor 252 requests the battery controller (not shown), via service processor 264, to remove power to the entire system planar 200.

2. 12 Volt Plane 204

The 12 volt plane 204 carries a specific voltage (i.e., 12 volts) used in support of power switch circuits 222 located the core plane 202. These circuits 222 control power to all the power planes except the core plane 202, 12 volt plane 204, and to the miscellaneous plane 206. Furthermore, it is possible for the firmware in the main processor to actuate these power switch circuits by programming certain registers located in the core plane 202. These will be fully described below. The 12 volt plane is powered as long as the core plane is powered. Similar to the core plane 202, the 12 volt plane 204 is not directly controllable by the main processor firmware or operating system software.

3. Miscellaneous Plane 206

The Miscellaneous Plane 206 includes the AT address and data bus transceivers 278, and the BIOS memory 272. The BIOS memory 272 contains the firmware needed to support multiple operating systems and certain power management functions. The Miscellaneous plane 206 receives power only in the full power state and the low power (idle) state of the system.

4. Main Processor Plane 208

The Main Processor plane 208 powers the Intel 386SX (or AM386SXL) processor chip 252. This plane is powered down by the core chip set (256, 258, 260) whenever the system enters the standby (sleep) state or the zero power state.

5. VGA Support Plane 210

The VGA Support plane 210 includes a VGA controller 274 with LCD control and display memory VRAM 276. The VGA controller 274 is a low-power vendor chip WD90C20. It provides the driver for an LCD flat panel which is industry standard VGA compatible. This plane remains powered in all states except the zero power state of the system. However, the VGA controller 274 itself is placed in a low powered mode when the system enters the standby state. In this mode, the display memory 276 is slow-refreshed to preserve the contents of the screen, although the screen (i.e., the LCD panel and backlight, both not shown) has been powered down. This scheme allows the system to restore the visual state of the screen without reloading the display memory 276 when the system enters the full power state from the standby state.

6. Solid State Support Plane 212

The Solid State Support Plane 212 powers the solid state file (SSF). It is powered down when the system enters the standby state or the zero power state. It receives power when the system is in the full power state and in the idle state.

7. Serial/Parallel Plane 214

The Serial/Parallel Plane 214 supplies power to the serial and parallel port control logic portion of the WD76C30 chip 256. This part of the chip, which is located in the core plane 202, is separately powered from the remaining parts of the chip. The Serial/Parallel Plane 214 receives power in the full power state or in the idle power state if and when an application requests the use of the underlying devices (not shown). It is turned off by the operating system after the application has indicated that it no longer needs use of the devices.

8. Speaker Plane 216

The Speaker Plane 216 includes the audio amplifier of the system speaker. This plane receives power in the full power state only if and when an application requests use of the speaker. It is turned off by the operating system after the application has indicated that it no longer needs the use of the speaker.

9. Small Computer System Interface (SCSI) Plane 218

The SCSI Plane 218 provides power to the SCSI controller and associated logic. This plane receives power in the full power state only if and when an application requests use of a device (not shown) attached to the SCSI plane. It is turned off by the operating system after the application has indicated that it no longer needs use of the attached device.

10. Keyboard Plane 220

The Keyboard Plane 220 controls power to an (optional) keyboard. This plane is power in the full powered state and in the idle power state of the system. It is powered down in the standby power state and in the zero power state.

Core Plane Detailed Description

The core plane 202 is comprised of the core chip set 256, 258, 260 which performs numerous power control functions. The core plane 202 is also comprised of the on/off glue logic 266 which monitors the condition of such systems as the battery and on/off switch to determine if an event has occurred which may require the state of the system to change. An event of this nature is defined as a power management (PM) event. The core chip set and the glue logic portions of the core plane 202 perform critical functions in the power management system, and are described below.

Core Chip Set Description

The compatibility with an IBM PC/AT and many power control functions are accomplished by what is defined as the core chip set. The three vendor chips 256, 258, 260 which comprise the core chip set are fully described in "Western Digital 1991 Devices Databook," Western Digital Corp., 1991. The core chip set is comprised of registers which are programmed to control the ten power planes of system planar 200. Each of the chips of the core chip set have been specifically designed for low power consumption. The vendor chips are described below, followed by a description of the register files contained therein.

1. WD76C10LP 260

This CPU and core logic controller chip incorporates a memory controller, main processor control, AT bus logic including DMA signals and power management control. Power management control implements a register file that can be accessed from the main processor and that allows for altering the clock speed of the main processor, for shutting down the main processor and/or other power planes in the system, and for resuming the execution of the main processor upon the occurrence of one or more external events.

2. WD76C21 258

This chip implements a floppy disk controller, real-time clock and IDE hard file control signals.

3. WD76C30 256

This chip implements standard AT style serial and parallel ports, programmable interrupt controllers and clock generators.

Core Chip Set Register Files

In the preferred embodiment, access to all power control functions and related data is achieved through a set of I/O buffers defined as register files. These register files are implemented in the core plane and illustrated in FIGS. 3(a) and 3(b). The following is a description of each of these registers and their associated functions:

1. Power Down Control Register (PDCR) 302

Two bits in the PDCR register 302 are of interest to power management. The first bit controls the power to the main processor plane 208. The other bit controls when there is a full power down sequence. This sequence will turn off the miscellaneous plane 206, the main processor plane 208, and optionally the VGA support plane 210.

2. CPU Clock Control Register (CCCR) 304

The CCCR register 304 contains the main processor clock speed. The CCCR register 304 may be programmed to reduce the main processor clock to ½, ¼th or ⅛th its normal value. Since the power consumption of a processor is proportional to the clock speed, operating the main processor 252 at the lowest possible clock speed will result in the maximum power saving.

3. Refresh Control Register (RCR) 306

The RCR register 306 contains the refresh rate of the system random access memory (RAM). It can be programmed to reduce the refresh rate to ⅛th the normal value whenever the system planar 200 enters the standby state.

4. Power Plane Control Register (PPCR) 308

The PPCR register 308 contains one bit for controlling power to each of the following power planes: speaker plane 216, VGA support plane 210, solid state support plane 212, SCSI plane 218, Serial/Parallel plane 214, and keyboard plane 220.

5. Screen Timer Control Registers (STCRs) 310, 312

Power to the LCD panel and its backlight are controlled by a pair of STCR timer registers 310, 312. The STCRs 310 and 312 can be set up to control the amount of time for which the LCD and backlight will be powered when there is no activity on the system.

6. Power Management Interrupt Mask Register (PMIMR) 314

The PMIMR register 314 is comprised of three mask bits corresponding to three power management (PM) events. A PM event is a condition change which may require the system to change state. Setting a bit to a value of one enables the corresponding PM event to raise a power management (PM) interrupt to the main processor 252. Setting the bit to a zero will prevent the PM event from causing a PM interrupt.

7. Power Management Interrupt Status Register (PMISR) 316

The PMISR register 316 contains the PM events which have caused a PM interrupt. This register is interrogated by the main processor 252 to determine which of the three PM events caused the latest PM interrupt.

8. Power Management Event Register (PMEVR) 318

The PMEVR register 318 contains information as to which PM event(s) took place. This register records the event and maintains a limited historical file of which events have occurred.

On/Off Glue Logic Description

Figure 4A:
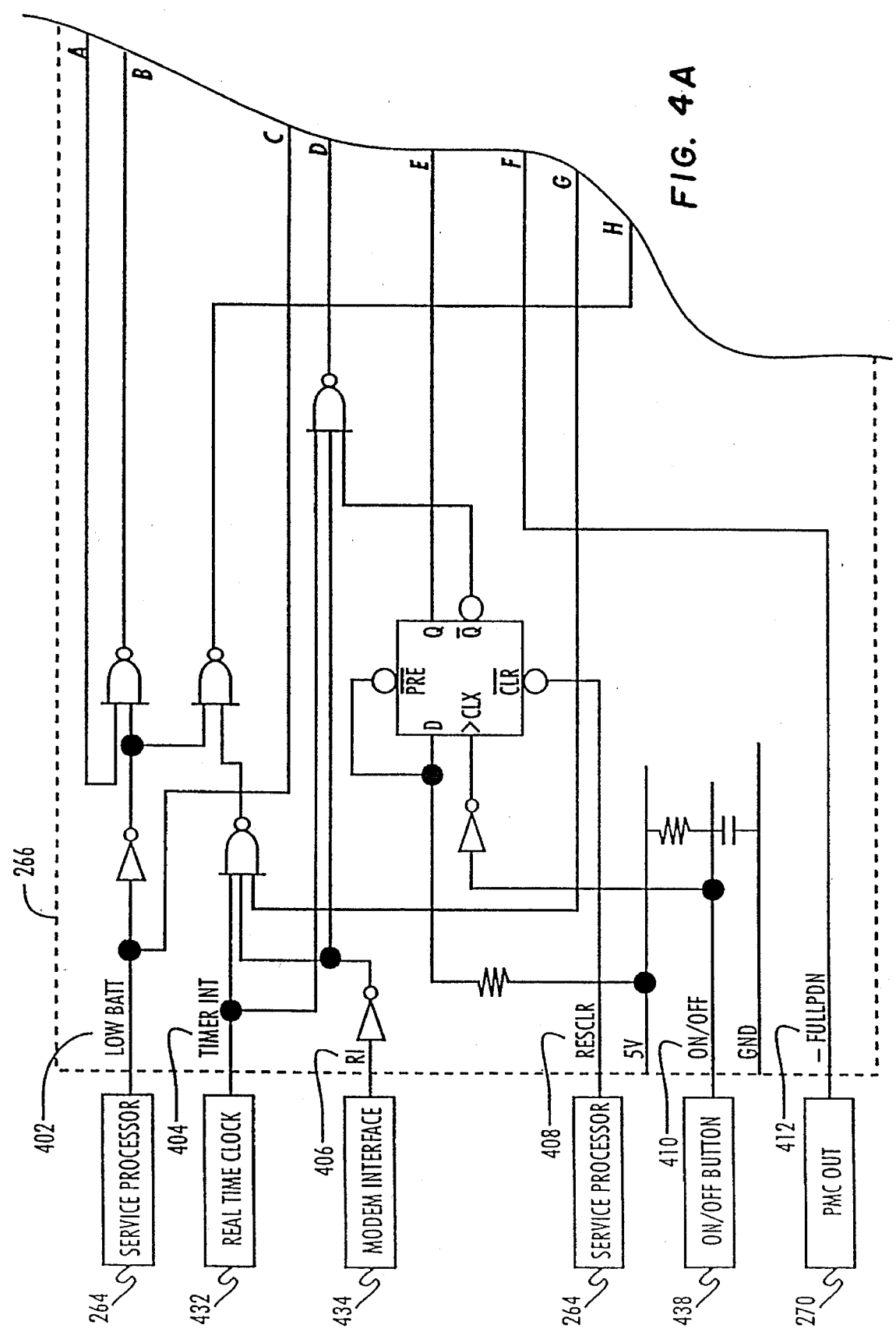
FIGS. 4(a) and 4(b) is a schematic block diagram of the On/Off switch logic.
Figure 4B:
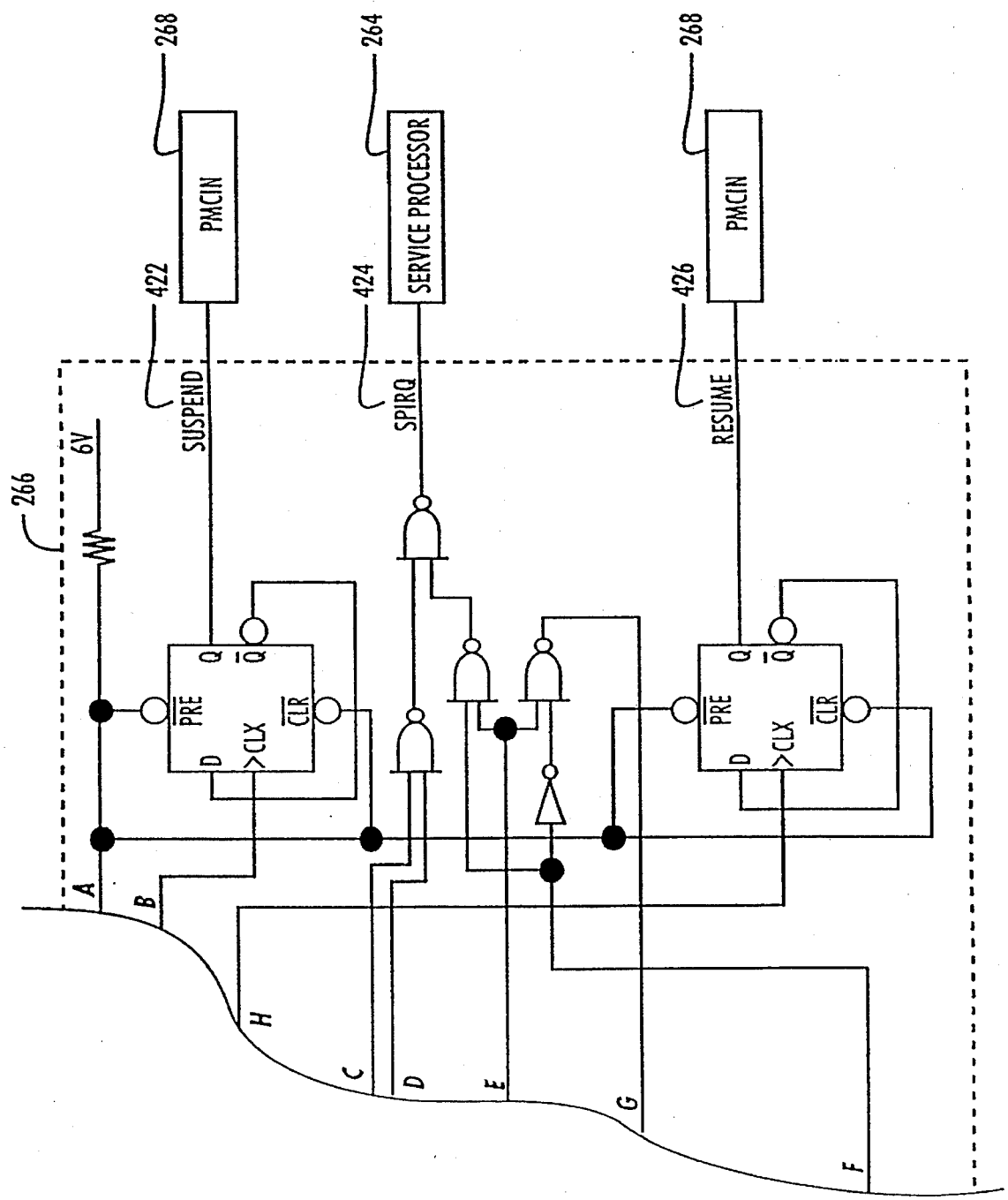

FIG. 4 is a schematic block diagram of the on/off glue logic 266 contained in the core plane 202. On/off glue logic 266 monitors the condition of such systems as the battery and on/off button to determine if an event has occurred which may require attention by the system. These inputs are received on the following input signal lines:

1. LOW BATT

The on/off glue logic 266 receives the low battery condition signal on the LOW BATT signal line 402 from the service processor 264. This signal indicates that the battery charge is low enough to alert the system.

2. TIMER INT

The on/off glue logic 266 also receives a timer interrupt signal on the TIMER INT signal line 404 from the real-time clock 432 which represents when a time-out condition has occurred. For example, if the system is in a normal power state and no activity has occurred for a predetermined length of time, the real-time clock 432 will transmit a timer interrupt signal to notify the system of the lack of activity.

3. RI

The on/off glue logic 266 also receives notification of an external modem call on the ring indicator (RI) signal line 406 from the modem interface 434.

4. RESCLR

The on/off glue logic 266 also receives a resume clear command on the RESCLR signal line 408 from the service processor. This signal commands the on/off glue logic 266 to delatch the on/off button.

5. ON/OFF

The on/off glue logic 266 also receives an indication of when the on/off button 438 has been pressed on the ON/OFF signal line 410.

6. FULLPDN

The on/off glue logic 266 also receives a full power down signal on the FULLPDN signal line 412 from the PMCOUT register 270. This signal indicates when the system is in the standby state.

The on/off glue logic 266 processes these inputs and generates appropriate output signals representing certain events which need to be addressed by the power management system. The three output signal lines are the RESUME signal line 426, SUSPEND signal line 422, and SPIRQ signal line 424.

1. RESUME signal line 426

The on/off glue logic 266 generates the RESUME signal on the RESUME signal line 426 when the system planar 200 is in the standby state (FULLPDN signal line 422 is active) and the on/off switch 438 has been pressed, the real-time clock 432 generates a timer interrupt signal, or there is a modem call ring indication. The RESUME signal will be inhibited if the on/off glue logic receives a low battery signal on the LOW BATT signal line 402 from the service processor 264.

2. SUSPEND signal line 422

The on/off glue logic 266 generates the SUSPEND signal on the SUSPEND signal line 422 when a low battery signal 402 is received from the service processor 264.

3. SPIRQ signal 424

The on/off glue logic 266 generates the SPIRQ signal on the SPIRQ signal line 424 when the on/off signal line 410 indicates that the on/off button 438 has been pressed when the FULLPDN signal line 412 indicates that the system was not in standby (normal or low power states). The SPIRQ signal is also generated when the low battery power condition signal is received on the LOW BATT signal line 402 and there is either a timer interrupt, modem call, or the on/off button is pressed, as described above for the RESUME signal line 426 output.

Power Management Events

There are three types of power management events that are recognized by the system planar's core chip set. These PM events are:

1. Suspend PM Event

A SUSPEND PM event is detected whenever the service processor 264 determines that the charge of the battery is below a particular threshold. The processing of the low battery 402 signal is performed by the on/off glue logic 266 and presented on the SUSPEND signal line 422 as discussed above. The vendor chip 260 will generate a SUSPEND PM event based on the state of this output signal and the state of the system. A SUSPEND PM event will only occur when the system is in the full power (normal) or low power (idle) state. A low battery condition in the standby state will not generate a SUSPEND PM event; rather, it will prevent the system from returning to normal power and will eventually turn itself off.

2. Resume PM Event

A RESUME PM event is detected whenever the system is requested to return from the standby state to address either a timer interrupt, modem call, or user demand. This is determined by the state of the on/off glue logic 266 RESUME output signal 426 and the state of the system. The system will only "resume" operation from the standby state; it is not operational in the normal and idle states.

3. PCUINT PM Event

This is an event that may be generated by the service processor 264 and detected by the core chip set whenever the system planar level 200 is in the full power (normal) state. This is one of many interrupts that may occur in the system and will occur due to many conditions, including when the on/off glue logic 266 generates a SPIRQ output signal 424.

All PM events are recorded in the power management interrupt status register (PMISR) 316 and the power management event register (PMEVR) 318, both implemented in the core chip set 256, 258, 260 and accessible by the main processor 252. Additionally, the main processor 252 can specify which of these events will generate a PM interrupt by setting the appropriate bits in the power management interrupt mask register (PMIMR) 314. In the preferred embodiment, the PM interrupt which is generated as a result of the PM events described has been designated as IRQ level 11 (IRQ11).

PM Event Reason Codes

As seen above, the PM events are generated upon the occurrence of different conditions and the state of the system. The different causes which generate the PM events are represented in the system by what has been defined as a reason code. The reason code is used by the system to determine how to respond to a particular PM event. The reason code will indicate one or more of the following conditions:

1. Battery Warning

This indicates that the battery charge is low enough to warrant a suspension of computer operation. This condition will cause a SUSPEND PM event if the system is in the full or idle state. If the system is in the standby state the service processor 264 will request the battery controller to turn the system power off. This results in the system entering the zero power state.

2. On/Off Button Pressed This indicates that the user has pressed the on/off button 438. This condition will cause a PCUINT or RESUME PM event.

3External Source Present

This indicates if an external DC source is present and that the system is no longer dependent on battery power. This condition will cause a PCUINT PM event.

4. Excessive Battery/Ambient Temperature

This indicates that the temperature of the battery is high (i.e., due to charging) or that the temperature of the system planar level 200 is very high due to excessive power consumption. This condition will cause a PCUINT PM event.

5. Battery Charge Fault

This condition indicates that the battery charger detected an over-voltage condition (i.e., battery was removed while being charged) or battery temperature became excessive while charging was in progress. This condition will cause a PCUINT PM event.

6. Ring Indication

This condition indicates that the system has received a modem call. This condition will cause a RESUME PM event in the standby state.

7. Timer Interrupt

This condition indicates the expiration of a time-out value. This condition will cause a RESUME PM event in the standby state.

II. OPERATING SYSTEM LAYER

In the preferred embodiment there are three processors. The main processor 252, which controls the system and is synonymous with it; the service processor 264, which manages peripheral devices; and the battery microcontroller, which manages the power sources. Each of these processors are multi-state machines, and are not always in the same state at the same time. The service processor 264 and the battery microcontroller will be discussed in their respective sections. Below, the state of the main processor operating system is discussed.

The computer operates in four (4) major states: Full power or Normal, Low Power or Idle, Standby or Sleep, and Zero Power. FIG. 5 is a state diagram illustrating each of the four major states of the operating system. The states of the system and transitions between each of these states is discussed below.

1. Transition 514: Zero Power 506 to Full Power 508

Initially, the system is in the zero power state 506. In this state, all power to the system is removed except to the battery controller. The battery controller is an 8 bit microprocessor which is placed in a standby mode when the system is in the zero power state 506. When in the standby mode, the battery controller consumes extremely low power (microamps). When the on/off button 438 is pressed, the battery microprocessor enters the normal mode of operation and turns on DC power to the rest of the computer.

The core plane 202, the VGA support plane 210, and the miscellaneous plane 206 receive full power first. After a short interval of time, power is applied to the main processor 252 which then executes a sequence of instructions in the machine's firmware. This code eventually gives control to the operating system. The operating system restores the various applications to the states obtained when the system entered the zero power state 506, irrespective of whether the user saved the data prior to it entering the zero power state 506. This includes refreshing (repainting) the screen as well as enabling various applications that were active at that time. During this initial entry into normal state 508, all power planes that have I/O devices attached to them—specifically, 12 volt plane 204 and keyboard plane 220 also receive power. Other peripherals such as the SCSI plane 218 are powered up if they are required by the applications.

2. Transition 518: Full Power 508 to Low Power 504

In the full power state 508, the multi-tasking operating system detects when there is no useful work being done in the system. This is indicated by the execution of the lowest priority thread in the system. This thread is defined as the idle thread. In the preferred embodiment, the idle thread invokes the main processor firmware which then places the main processor 252 in the low power or idle state 504.

The low power or idle state 504 is a low power operational state in which the clock speed of the main processor 252 is reduced. This state is immediately entered whenever there is no activity in the system. The appearance of the computer is no different than when the system is in the normal state. However, after a certain period of inactivity in the idle state, the backlight of the LCD panel is turned off to further conserve power. This is done by the firmware programming of the screen time control registers (STCRs 310). The user can still view the screen albeit with reduced clarity. This results in substantial reduction of power consumption in the low power state 504.

3. Transition 520: Low Power 504 to Full Power 508

When an interrupt is detected by core chip WD76C10LP 260, it automatically sets the clock speed of the main processor 252 back to full speed for a small interval of time sufficient to process the interrupt as fast as possible. When the interrupt is completely processed, the firmware turns on the backlight (if the interrupt is caused by the stylus or the keyboard), reprograms the control chip WD76C10LP 260 to continue main processor operations at full clock speed, and returns to the operating system's idle thread. (The logic of the firmware of the preferred embodiment is fully described in a later section.) The idle thread then invokes the operating system's dispatcher to determine if any application threads have been made executable as a result of the recent interrupt. If so, control is given to such a thread and the full power state 508. If no such thread has been made dispatchable, then the idle thread gains control again. The idle thread then invokes the firmware to reenter the low power state 504.

4. Transition 510: Full Power 508 to Standby Power 502

When the system has been in the low power or idle state 504 continuously (except for short bursts of full power state 508 to handle periodic interval timer interrupts) for some length of time, a time-out alarm is received from the real-time clock 432. This alarm is received in the form of an interrupt. This will return the system to the full power state 508 as described above. When processed by the operating system, this interrupt indicates that the activity level of the system is low enough to warrant entry into the standby state 502. The time-out period may be set by the user, otherwise a default time-out period is used by the operating system. In the preferred embodiment, the default value is 5 minutes. Entry into the standby state 502 is also triggered by two PM events: SUSPEND (due to low battery charge) and PCUINT (due to pressing the on/off button).

The operating system requests the firmware to turn off the LCD and its backlight (to immediately effect a power saving) and then proceeds to save application data to the solid state file (SSF) 280. The saving of application data is necessary because there is a possibility that the system may not be able to resume after entering the standby state 502. Subsequent to saving the application data, the operating system enters the standby state 502 by invoking the appropriate firmware logic. In the standby state 502, the user's primary interaction devices, i.e., LCD panel, digitizer and keyboard are inoperative, having been placed in the off or standby state by the firmware. The user thus perceives the state of the computer as being off.

In the case of a PCUINT PM event, the on/off button 438 has been pressed indicating that the user desires to shut the computer off. The operating system requests the firmware to turn off the LCD and its backlight (to immediately effect a power saving).

5. Transition 512: Standby Power 502 to Full Power 508

From the standby state 502, the system can only be brought to full power or normal state 508 by a RESUME PM event. As discussed above, the occurrence of the RESUME PM event has three causes. Each of these causes is described separately below:

5a. Transition 512 Due to On/off Button Press

When the system is in the standby state 502 (appears to be "off" to the user), and the on/off button 438 is pressed, a RESUME event is generated if the battery charge is sufficient. If the battery charge is low, returning to full power or normal state will consume more power. As a result, the computer will notify the user audibly or visually that the computer cannot resume operation due to the lower power condition.

If the battery charge is sufficient, the event is captured by the WD76C10LP chip 256 on the core plane 202. The WD76C10LP chip 256 then applies power to the main processor 252 which then commences execution at the reset vector. The power on self test program (POST) can determine the reason the reset vector was entered. This information is passed to the operating system (which is still in the DRAM 262). The POST code also restores the normal refresh rate for the DRAM 262. The operating system then powers up the I/O devices such as the LCD/digitizer 254 and the keyboard plane 220. This sequence of events is interpreted by the user as the computer being in the ON state. Furthermore, because the amount of time taken to reach this state is very short (of the order of 2 seconds or less), the user perceives that the system has turned on instantaneously, hence the notion "instant on." At this point, the operating system level 110 and the system planar level 102 are ready to respond to user inputs.

5b. Transition 512 Due To a Modem Call

If an external call is received at the modem interface 434, the glue logic 266 is notified by receiving the modem call signal on the RI signal line 406. Provided the battery charge is not low, the glue logic will generate the RESUME signal which will be received by WD76C10LP 256. As in the case of the on/off button 438, this event causes the WD76C10LP chip 256 to apply full power to the main processor 252. The main processor 252 then enters the reset vector as discussed above, and returns to the operating system with a reason code that indicates that a modem call is pending. The operating system then processes the call, invoking appropriate application programs, if any, and returns after a timeout period to the standby state 502. Note that the operating system does not turn on the LCD or backlight, since the resume event was not triggered by the user.

5c. Transition 512 Due to a Real-Time Clock Interrupt

With the system in the standby state 502, the system planar level 200 continues to draw a certain amount of power, principally to keep the core plane 202 active and to keep the DRAM 262 and VRAM 276 refreshed. Before entering the standby state 502, the operating system programs the real-time clock 438 to generate an alarm at a pre-specified time-out interval. When this value is reached, the real-time clock 438 generates an interrupt which in turn causes a RESUME PM event to be detected by the WD76C10LP chip 260. The WD76C10LP chip 260 then places the main processor 252 in the normal state 508. The main processor 252 enters the reset vector which then gives control to the operating system with an appropriate reason code. This reason code indicates to the operating system that resumption was due to an alarm generated by the real-time clock 438. This event could be interpreted by the operating system as an indication that it must now enter the off state 506. Interrupts from the real-time clock 438 can also occur to signal execution of one or more scheduled tasks. As in the case of the modem call, no I/O device is powered up since this is not a user initiated resumption.

6. Transition 516: Full Power 508 to Zero Power 506

The computer enters the zero power state 506 only under the condition of the occurrence of a time-out while in the standby state 502. The pressing of the on/off button 438 to turn the computer off will result in the computer entering the standby state 502. The computer will remain in this state until a time-out value has been reached. At that time, the operating system invokes the firmware to send a command to the service processor 264 to instruct the battery controller to turn off power to the entire system. The battery controller then shuts off power to all power planes of the computer. The battery controller itself enters a standby state in which it consumes a very small amount of current.

III. MAIN PROCESSOR FIRMWARE LAYER

The firmware in the main processor 252 embodies the mechanisms needed by the operating system to perform power management control. It is responsible for effecting the actual state transitions of the main processor 252 and the system planar 200, and thereby the computer.

The main processor firmware is invoked under two circumstances: whenever a PM interrupt is received by the main processor 252 or whenever the operating system is required to make a state transition.

1. Power Management (PM) Interrupt Handler

Figure 6:
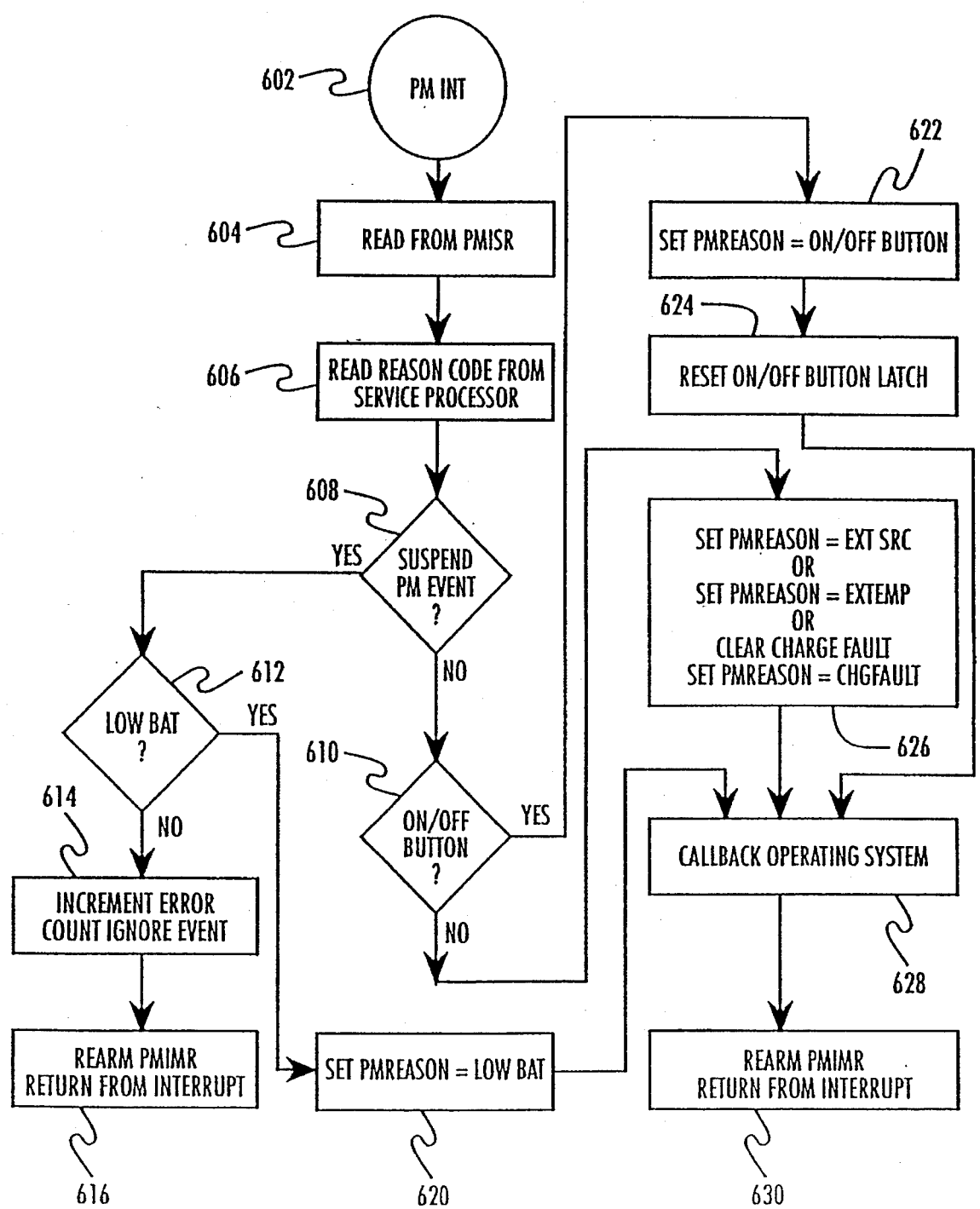
FIG. 6 is a flowchart of the main processor firmware logic for the Power Management Interrupt Handler.

The PM interrupt handler's logic is shown in FIG. 6. In the preferred embodiment, the power management (PM) events which can be programmed to cause a PM interrupt are determined by setting the associated mask bit(s) in the power management interrupt mask register (PMIMR) 314. In the full power state 508 and the low power state 504, the power management interrupt mask register (PMIMR) 314 is programmed to allow the PCUINT PM event and the SUSPEND PM event generate a PM interrupt. The RESUME PM event is not permitted to cause a PM interrupt in the full power state 508 and the low power state 504 because the system is already operational in these states. In the Standby state 502, the power management interrupt mask register (PMIMR) 314 is programmed to allow the RESUME PM event to generate a PM interrupt. The RESUME PM event is the only PM event which may generate a PM interrupt when the system is in the standby state 502.

When a PM interrupt is received, step 602, the power management interrupt status register (PMISR) 316 is read to determine which PM event caused the PM interrupt, step 604. Since the system is not in standby state 502, it is either the PCUINT PM event or SUSPEND PM event. The service processor 264 is then queried for the cause of the PM event, step 606. The cause of the PM event will be one of the reason codes discussed previously. If the firmware determines that the PM interrupt is caused by a SUSPEND PM event, step 608, the firmware executes step 612 to verify that the reason for the SUSPEND PM event is a low battery condition. If not, then the PM event is ignored since the low battery condition is the only cause which will generate the SUSPEND PM event, step 614. The PMIMR register 314 is then rearmed to receive future PM events, step 616. If the SUSPEND PM event is the result of a low battery condition, step 612, then the firmware informs the operating system of the cause by setting the PMReason variable to indicate that a low battery condition has occurred, step 620. The firmware then performs a callback to the operating system, step 628. This step will be further discussed below.

If the PM interrupt was due to a PCUINT PM event, step 608, then the reason code is read to determine if it is due to the on/off button 438 being pressed, step 610. This cause of the PCUINT PM event indicates that the user wants to power down the computer. As a result, the firmware notifies the operating system by setting the PMReason variable to indicate this, step 622, and then releases the on/off button latch (via a command to the service processor 264 to send the resume clear signal to the on/off glue logic 266), step 624. The firmware then performs a callback to the operating system, step 628. This step will be further discussed below.

If the PM interrupt was due to any other reason which would cause a PCUINT PM event, for example, the presence of an external source, then the information is passed on to the operating system in a likewise manner, step 626. For a battery charge fault condition, the charge fault is first cleared by a command to the service processor 264, and the information is then passed to the operating system.

After the callback to the operating system occurs, step 628, then the PMIMR register 314 is reset to receive additional PM event indications, step 630.

Step 628, callback to the operating system, is a coding technique whereby one software component (in this case the operating system) anticipating a future event, tells another component (in this case the firmware) to pass control to a specified location in the former upon detection of an external event. The callback capability is disclosed in the commonly owned patent application titled, "Techniques for Supporting Operating Systems for Portable Computers", by Kannan et al., (Attorney Docket No. YO991154/1252.1210000), which is concurrently filed herewith, the disclosure of which is incorporated herein by reference.

2. Firmware Logic for State Transitions

Figure 7:
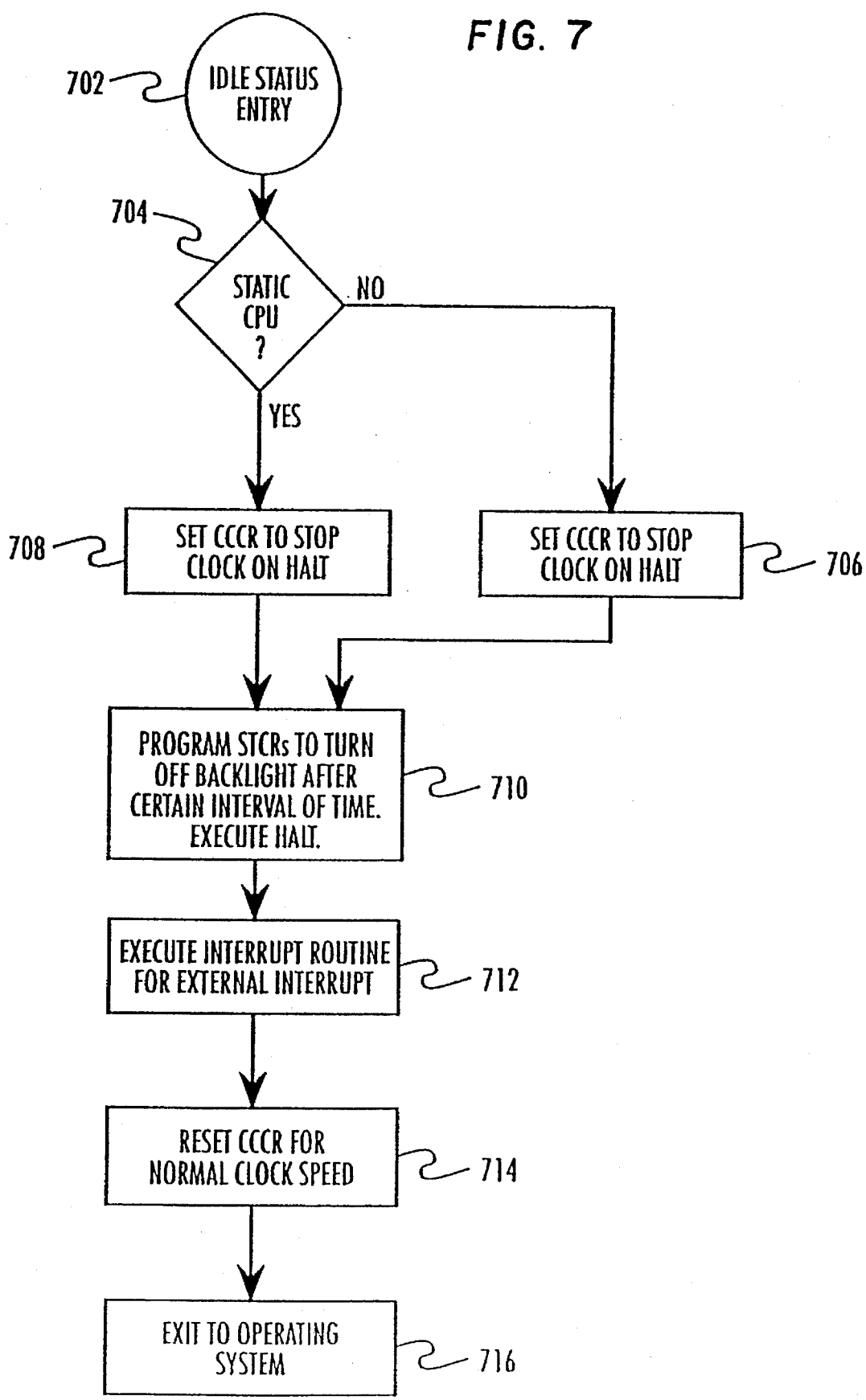
FIG. 7 is a flowchart of the main processor firmware logic for transitioning between the full power state and the low power state.
Figure 8A:
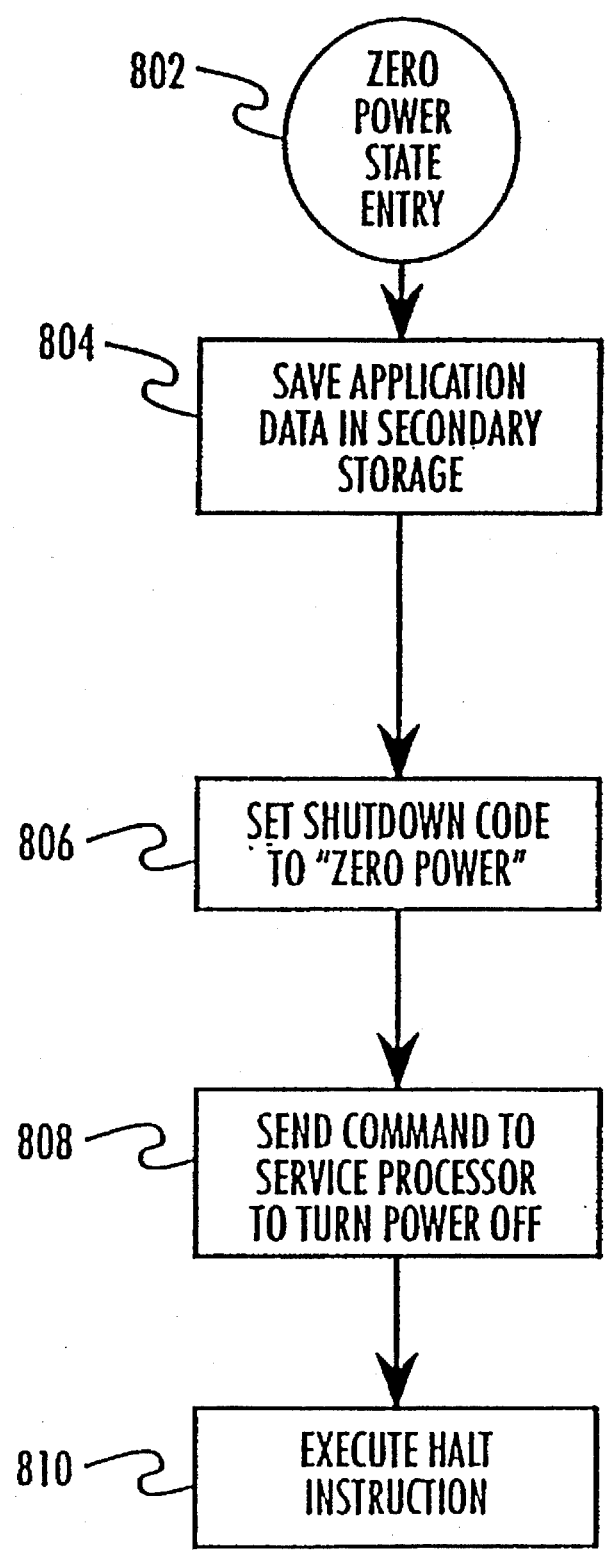
FIG. 8(a) is a flowchart of the main processor firmware logic for entering the zero power state from the full power state.
Figure 8B:
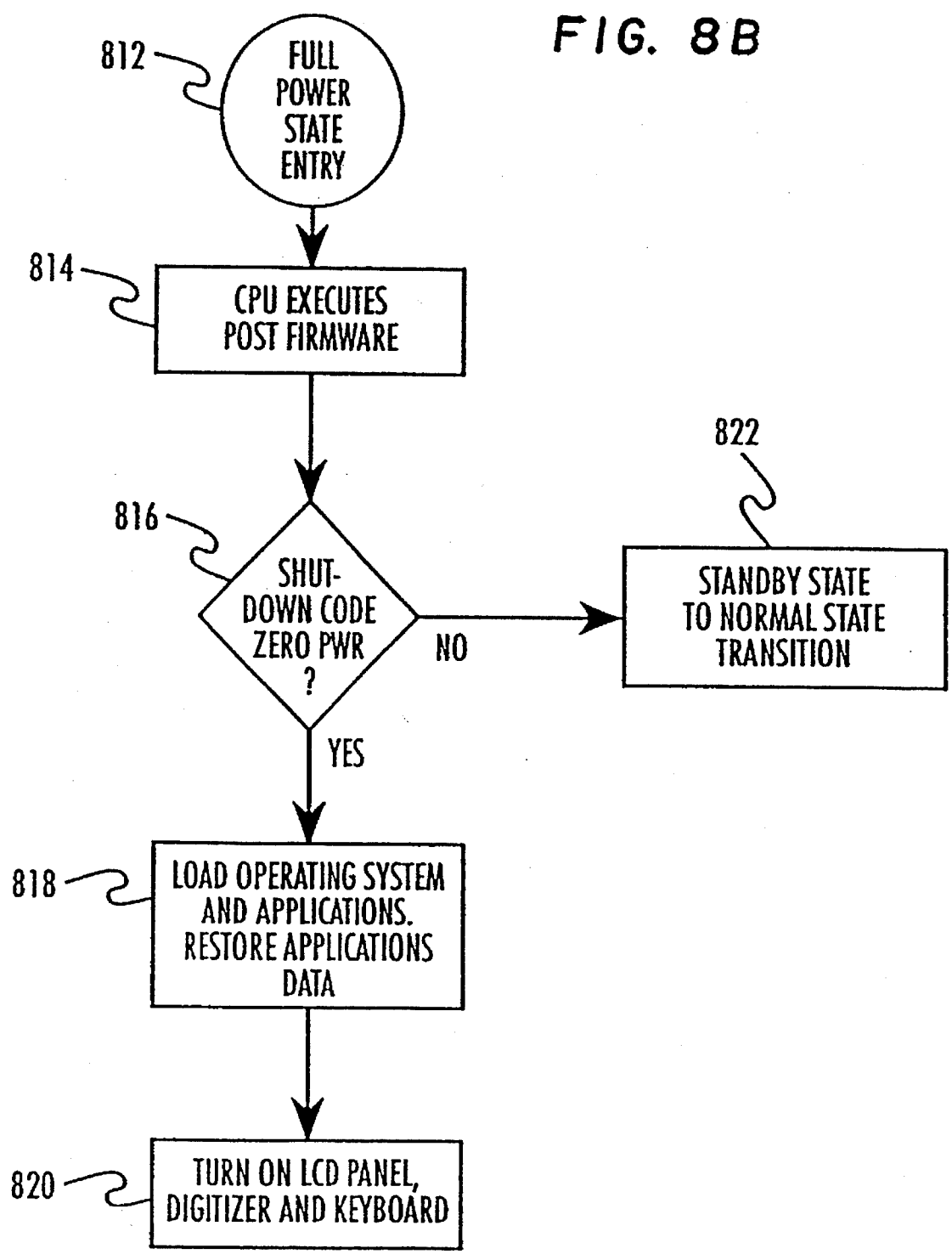
FIG. 8(b) is a flowchart of the main processor firmware logic for entering the zero power state from the full power state.

The description of the main processor firmware which is invoked to support the operating system layer 110 perform the state transitions is divided into three sections. The first section will describe the firmware logic for transitioning between the full power state 508 and the low power state 504 and is illustrated in FIG. 7. The second section will describe the firmware logic for transitioning between the full power state 508 and the zero power state 506 and is illustrated in FIGS. 8(a) and 8(b). The third section will describe the firmware logic for transitioning between the full power state 508 and the standby state 502. This section is supported by FIGS. 9(a) and 9(b).

a. Firmware Logic for Full Power/Low Power State Transition

The logic for transitioning the system planar 200 between the full power state 508 and the low power state 504 is given in FIG. 7.

When the operating system wishes to make a transition to the low power state 504 based on some conditions in the system, the firmware is invoked, step 702. First, it is determined whether the main processor 252 is a static processor (such as the AM386SX) or a non-static processor (such as the Intel 80386SX), step 704. A static processor has the ability to maintain the CPU state without receiving a clock input. A non-static processor will lose the CPU state unless it continually receives a clock input. If the main processor 252 is a non-static processor, the CPU clock control register (CCCR) 304 is programmed to reduce the clock to a low clock speed upon the execution of the halt instruction, step 706. If a static processor is in use, the CPU clock control register (CCCR) 304 is programmed to stop the clock upon execution of the halt instruction, step 708. Then the halt instruction is executed, step 710. If the clock speed was reduced, the WD76C10LP chip 256 (which is part of the core chip set), then slows the clock speed to the lower rate. In the preferred embodiment, the normal clock rate is 20 MHz and the low clock speed is 2.5 MHz. Also in step 710, the STCR registers 310 are programmed to turn off the backlight after a certain interval of time. In the preferred embodiment this interval is 30 seconds.

The system will then remain in the low power state 504 until an external interrupt (such as an interval timer) occurs. This will cause the WD76C10LP 256 to set the main processor clock speed to its full rate, i.e., 20 MHz in the preferred embodiment and execute the interrupt routine 712 at the normal clock rate. Subsequent to the completion of the interrupt routine, the firmware will reset the CPU clock control register (CCCR) 304, step 714 and exit to the operating system, step 716.

b. Firmware Logic for Normal/Off State Transition

The logic for transitioning the system planar 200 between the full power state 508 and the zero power state 506 is given in FIGS. 8(a) and 8(b).

Referring to FIG. 8(a), the operating system transitions to the zero power state 506 only when a time-out has occurred while the system was in the standby state 502. Therefore, all power planes except the core plane 202, miscellaneous plane 206 and VGA support plane 210 remain powered off. The time-out occurs due to lack of activity for a predetermined length of time. When this occurs, the firmware is invoked, step 802. First, all application data is saved in a secondary storage medium, step 804. Next, a code is written to a non-volatile RAM (NVRAM) location (called shutdown code) to indicate that the system is entering the zero power state 506, step 806. Then, a command is sent to the service processor 264 to remove power from the system, step 808. Finally, a halt instruction is executed, step 810.

Referring to FIG. 8(b), the operating system transitions to the full power state 508 from the zero power state 506 only when the on/off button 438 is pressed. When power is applied to the main processor plane 206, the core chip set commences execution at the reset vector. The power on self test program (POST) firmware is then executed, step 814.

The shutdown code is then read to determine if the full power state 508 has been entered from the zero power state 506, step 816. If not, then this is state transition 512 from the standby state, and the firmware for that state transition is called. If the shutdown down code indicates that this is transition 514 from the zero power state 506, the operating system is loaded on to the system along with the applications software, step 818. In addition, the application data that was stored prior to the system entering the zero power state 506 will be restored. This will enable the computer to return to the exact point in the application program that it left at power down. Then, the peripheral devices are powered up, and the computer is fully operational, step 820.

c. Firmware Logic for Full Power/Standby State Transition

Figure 9A:
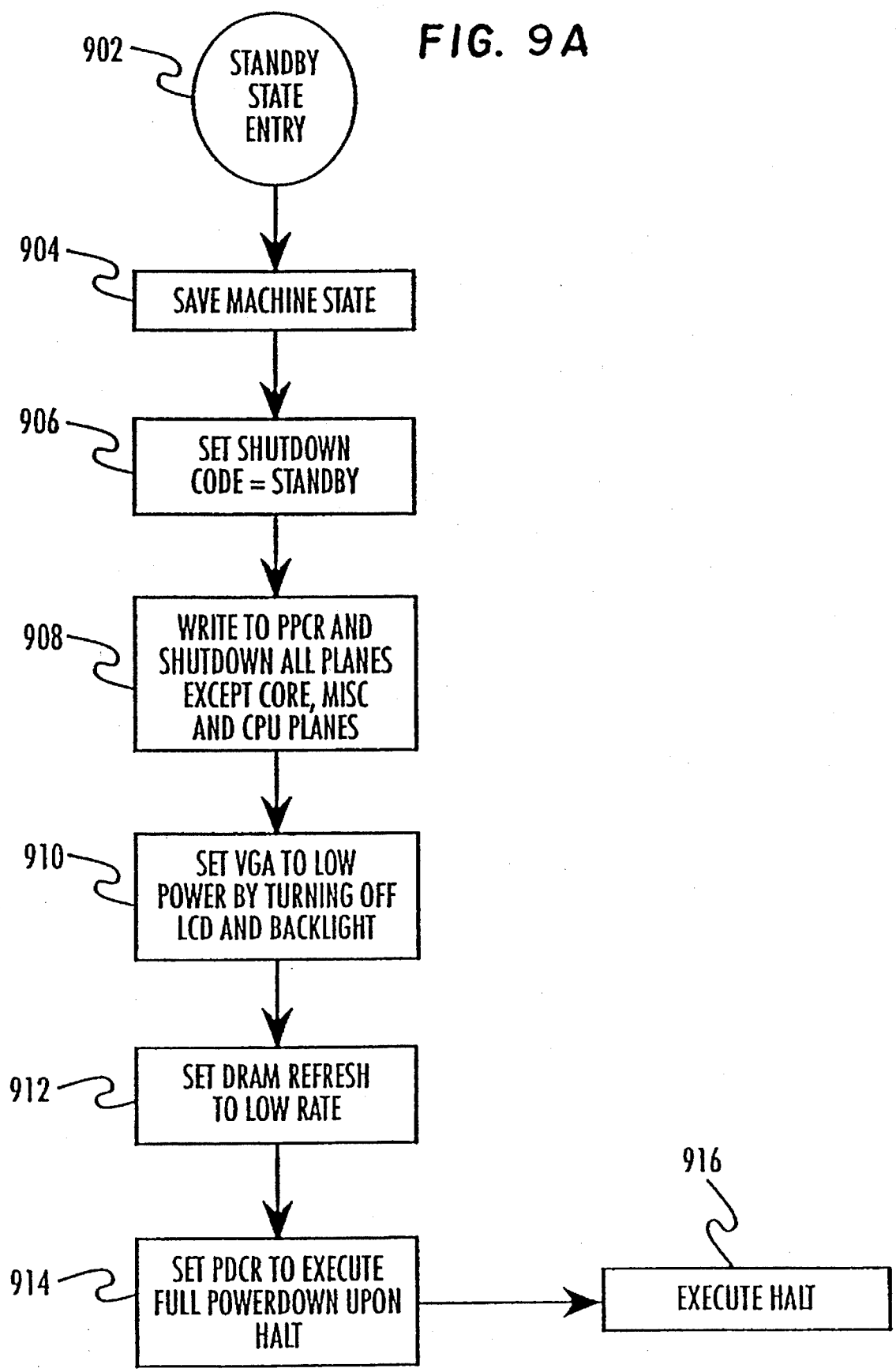
FIG. 9(a) is a flowchart of the main processor firmware logic for entering the standby power state from the full power state.

The main processor firmware logic for placing the system in the Standby state 502 is given in FIG. 9(a).

When the operating system is required to make a transition to the standby state 502 based on some conditions in the system, the firmware is invoked, step 902. The state of the main processor 252 is saved in DRAM 262, step 904. The state information includes all data registers and certain registers used to control addressing-related and protection mode related data. Next, a code is written to a nonvolatile RAM (NVRAM) location (called shutdown code) to indicate that the system is entering standby state 502, step 706. Next, all power planes (except the core plane 202, the VGA support plane 210, the miscellaneous plane 206, 12 volt plane 204, and the main processor plane 208) are powered down by programming the power plane control register (PPCR) 308, step 708. Next, the VGA chip WD90C20 274 is placed in the low power state by turning off the LCD and backlight power by clearing the screen timer control registers (STCRs) 310, 312, step 910. Next, the DRAM 262 and the VRAM 276 refresh rates are lowered by programming the Refresh Control Register (RCR) 306, step 912. Next, the power down control register (PDCR) 302 is programmed to indicate that the core chip set must power down the main processor plane 208 and miscellaneous power plane 216 when a halt instruction is executed, step 914. Finally, a halt instruction is executed, step 916.

At this point, all power planes with the exception of the core plane 202 and the VGA support plane 210 are powered down. The VGA chip 274 is placed in the low power mode. Thus in this state, the system planar 200 consumes a minimal amount of power, just enough to keep the core plane 202 alive and the RAM (VRAM 276 and DRAM 262) contents valid.

Figure 9B:
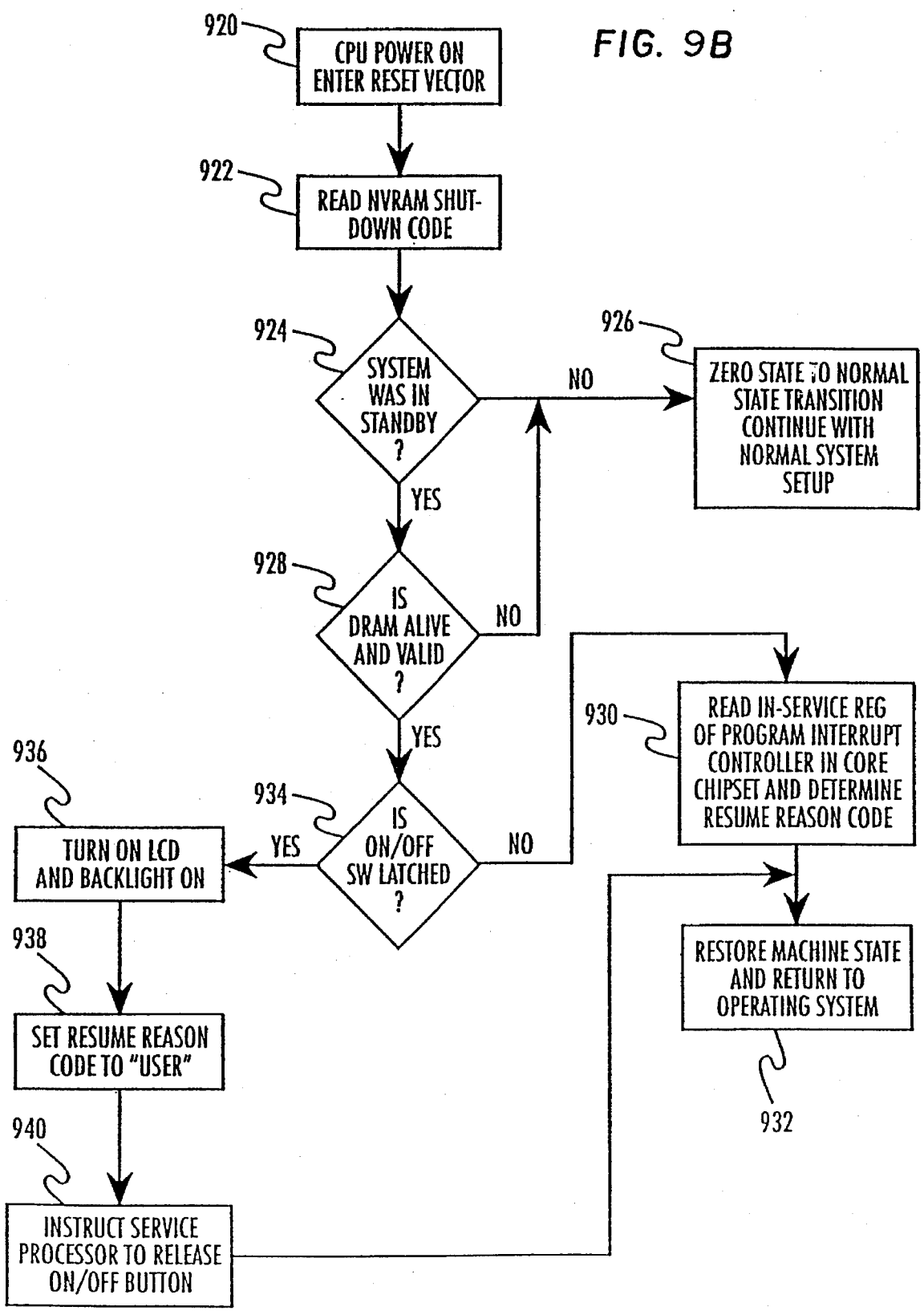
FIG. 9(b) is a flowchart of the main processor firmware logic for managing the RESUME PM event and entering the full power state from the standby power state.

The main processor firmware logic for placing the system in the Normal state 508 from the Standby state 502 is given in FIG. 9(b). FIG. 9(b) is also a flowchart of the firmware logic which manages the RESUME function. The RESUME PM event is caused by the occurrence of a number of conditions when the system is in the standby state 502. First, when power is restored to the CPU, control is given to the reset vector in the firmware, step 920. This code checks the NVRAM location (referred to earlier as shutdown code), step 922, to determine if the system is transitioning from the standby state 502 to the full power state 508, step 924. If not, normal power-up procedure is followed, step 926. If the system was in the standby state 502, then the validity of the DRAM is verified, step 928. If the DRAM is not valid, the normal power-up procedure is followed, step 926. If the DRAM is valid, the firmware interrogates the service processor 264 to determine if the resumption is due to the pressing of the on/off button 438, step 934. If so, the firmware then turns on the LCD/backlight by writing into the screen timer control registers (STCRs) 310, 312, step 936. The RESUME reason code is set to reflect the fact that the on/off button 438 has been pressed and the user wants to operate the system, step 938. This results in the VGA support power plane 210 being fully powered and refreshes the screen thereby supporting the perception of the user that the computer has been turned on. Next, the service processor 264 is instructed to de-latch the on/off switch 438, step 1018. If the on/off switch 438 is not latched, step 934, then the firmware restores the CPU registers that were saved when the system was entering standby state 502. Finally, the operating system is given control right after the point where it made the initial request to enter standby state 502.

If the on/off button 438 was not pressed, then the interrupt controller in the core chip set is interrogated to determine if the real-time clock or the modem has caused the RESUME event. The RESUME reason code is set accordingly. In either case, the screen is not turned back on; rather the reason code is passed back to the operating system after machine state is restored.

IV. SERVICE PROCESSOR LEVEL

The service processor 264 is an auxiliary processor that resides on the core plane 202 of the system planar 200. The service processor 264 is responsible for communicating with and controlling a number of peripheral devices including the battery controller. In the preferred embodiment, the service processor 264 is a National Semiconductor HPC46064 with 16K bytes of on-board ROM and 512 bytes of RAM locations. However, any comparable 16 bit microprocessor can execute the logic that is described here.

Service Processor Hardware Description

Figure 10:
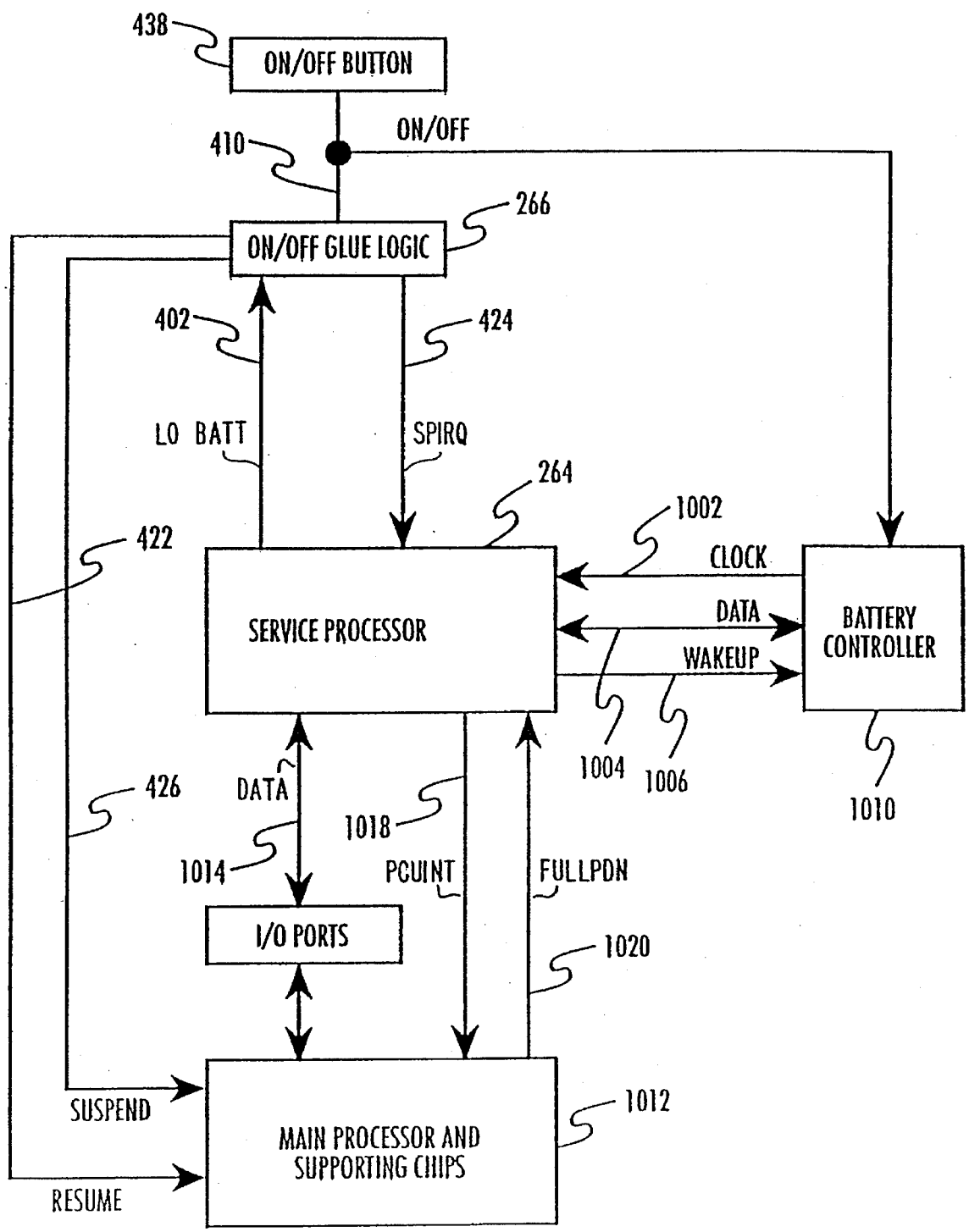
FIG. 10 is an interface block diagram illustrating the service processor interface signals.

FIG. 10 is a block diagram illustrating the essential interfaces used by the service processor 264 with regard to power management. They are:

Interface with Battery Controller 1010

The interface with the battery controller 1010 is comprised of three signal lines. They are the Clock signal line 1002, Data signal line 1004, and the WakeUp signal line 1006.

The WakeUp signal line 1006 is used by the service processor 264 to command the battery controller 1010 to change from the idle state to the normal state.

The data signal line 1004 and the clock signal line 1002 are used for the exchange of data between the service processor 264 and the microprocessor in the battery controller 1010. The service processor 264 issues commands to the battery controller 1010 based on requests it receives from the main processor 252. Each command is encoded in a single data byte that is transmitted over the data signal line 1004. The following three commands are used in the preferred embodiment:

1. Turn power off

This command is sent by the service processor 264 to the battery controller 1010 to turn power off to the system planar 200 (including the service processor 264).

2. Clear Power Disrupted Flag

The clear power disrupted flag and bytes which identify that a power source is present in the system are maintained and preserved as long as the battery is not removed from the computer. The bytes which identify that a power source is present are defined as signature bytes. They are stored in a dynamic RAM associated with the battery controller 1010. This RAM is kept valid as long as a battery remains inserted in the machine or an external source is present. If the user removes the battery, the signature bytes are corrupted. Subsequently, when power is restored to the system due to re-insertion of a fresh battery (or insertion of an external DC source), the battery controller 1010 can detect that the signature bytes have been corrupted and reports this fact by setting the Power Disrupted flag. This command will clear the flag.

3. Clear Charge Fault

A charge fault occurs when an over-voltage condition (i.e., battery was removed while being charged) occurs or when the battery temperature becomes excessive while charging was in progress. The battery controller 1010 detects this and reports this fact by setting the Charge Fault flag. This command will clear the flag.

Interface with On/off Glue Logic

The action of the on/off button 438 is controlled by the glue logic surrounding it. This on/off glue logic is shown in FIG. 4. As shown in FIG. 10, in addition to interfacing with the service processor 264, the on/off glue logic 266 also interfaces with the main processor and core chips 1012. The on/off button 438 interfaces not only with the on/off glue logic 266 but also with the battery controller 1010 to perform power management functions related to the service processor 264.

If the system is in zero power state, the on/off button 438 activates the battery controller 1010 and power is eventually turned on to the system planar 200. If the system planar level 200 is in standby state 502, the on/off button 438 causes the on/off glue logic 266 to generate a RESUME signal that is monitored by the support chips of the system planar 200. If the system planar 200 is in normal state 508, the on/off signal generated by the on/off button 438 is transmitted to the service processor 264 as the SPIRQ signal and is handled as an external interrupt. The service processor 264 uses this signal as one of the events that trigger PCUINT.

The low battery signal is generated by the service processor 264 and transmitted over the LOW BATT signal line 402 and monitored by the on/off glue logic 266. The LOW BATT signal is generated by the service processor 264 whenever it perceives the battery charge (voltage) to be below a threshold value. This signal is used by the on/off glue logic 266 in determining which output signal to generate when an event occurs during a low battery charge condition. If the system is in the normal state or idle state, the LOW BATT signal causes the on/off glue logic 266 to generate a SUSPEND signal. The SUSPEND signal causes a PM interrupt to be presented to the main processor 252. If the system is in the standby state, the LOW BATT signal causes the service processor to instruct the battery controller to turn power off to the system.

Interface with the Main Processor and Core Chip Set

The interface with the main processor 252 and the core chip set 256, 258, and 260 is represented by element 1012, entitled main processor and support chips. There are three signal lines which are used to interface the service processor 264 with the main processor and support chips 1012. They are the data signal line 1014, the PCUINT signal line 1018, and the FULLPDN signal line 1020.

1. FULLPDN Signal Line

The Full power down signal is generated by the main processor and support chips 1012 and transmitted over the FULLPDN signal line 1020 whenever the main processor 252 is shut down and no activity is anticipated for some time. It is used by the service processor 264 to change its state from full power state to low power state.

2. PCUINT Signal Line

The power control unit interrupt signal is generated by the service processor 264 and transmitted on the PCUINT signal line 1018. It indicates that a PM event has taken place that needs the attention of the main processor 252. When the PCUINT signal is activated, a PM interrupt is presented to the main processor 252. The main processor 252 must respond to this interrupt with a "query power environment" command over the data line 1014 within 0.5 seconds. Otherwise, the service processor 264 assumes that the main processor 252 has crashed and will send a power-off command to the battery controller 1010, thus shutting off power to the system.

3. Data transfer and control

The main processor interface is similar to the PS/2 keyboard controller interface. Commands can be written by the main processor 252 to the service processor 264 and results (if any) can be read by the main processor 252 over a pair of internal byte-wide buffers. The protocol for communication between the two processors is documented in the PS/2 Technical Reference Manual. New commands that have particular relevance to the power management aspects of the preferred embodiment have been added and are described here. Briefly, commands from main processor to service processor 264 are written to an I/O port located at 0×64. The results of the commands can be read by the main processor from I/O port located at 0×60. Some commands are optionally followed by one or more parameter bytes. The parameter bytes are written to port 0×60.

4. Query Power Environment

This command is followed by a single parameter byte that specifies exactly what data is being requested. The following data may be requested:

a. Reason Code

The main processor 252 asks for this information whenever a PM interrupt is presented to it. The service processor 264 returns a single byte of data that describes the event(s) that may have taken place to cause a PCUINT or a SUSPEND PM event. The information encoded includes battery condition (normal or low charge), on/off button status (pressed or not), temperature condition (excessive or not), power source (external source present or not) and whether a fault condition within the battery controller has occurred or not. After presenting this data, the service processor clears its internal memory pertaining to the above data.

b. Power Status

This information is data that is collected by the service processor 264 from the battery controller 1010 periodically. The service processor 264 returns a single byte that encodes status information regarding battery type (e.g., NiCd or NiMh) and capacity (half size and full size), whether power disrupted flag is set in the battery controller 1010 or not and whether the battery has been changed. The latter is used in the battery gauge algorithm implemented by the service processor 264.

c. Battery Voltage

The service processor 264 returns a byte that encodes the battery voltage. In the preferred implementation, the unit is 117 millivolts.

d. System Load

The service processor 264 returns a byte that signifies the current load on the system.

e. Battery Temperature

The service processor 264 returns a byte that encodes the current battery temperature.

f. Ambient Temperature

The service processor 264 returns a byte that encodes the current temperature of the system planar 200.

5. Send command byte to battery controller 1010

This command is followed by a parameter byte that is sent to the battery controller for execution. The commands defined in the preferred embodiment are:

a. Clear power disrupted flag

The battery controller will clear its internal flag that represents power disruption.

b. Clear charge fault condition

The battery controller will clear its internal flag that represents this condition.

Service Processor Power States

Figure 11:
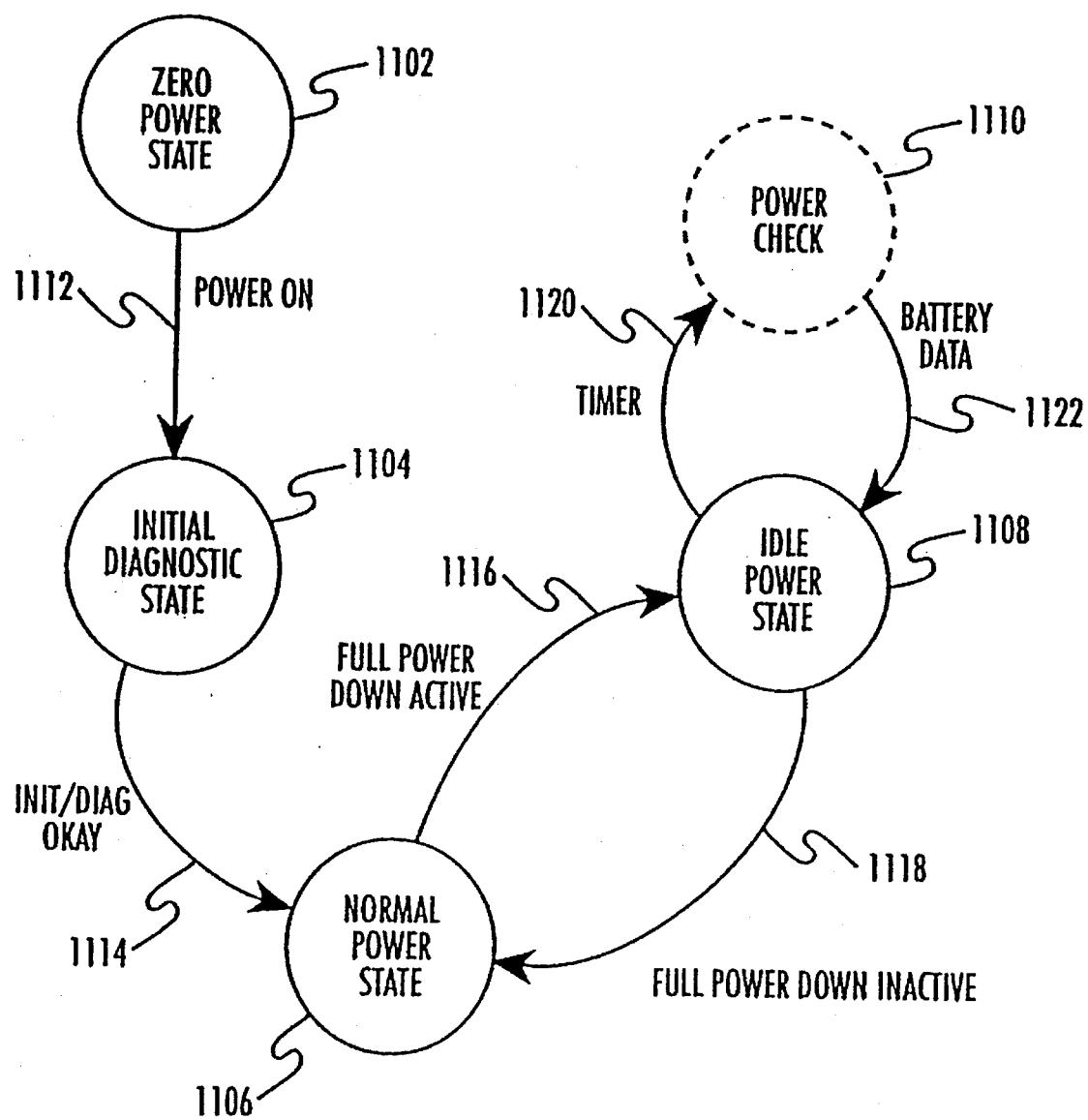
FIG. 11 is a state diagram of the service processor firmware.

FIG. 11 illustrates the states of the service processor 264 as it relates to power management. The transitions between the states are driven by the signals described above and commands from the main processor 252. The states and the transitions are described below:

1. Zero power state 1102

This is the state in which no power is supplied to the service processor 264 and is entered whenever the DC power is turned off by the battery controller 1010 or when the battery is removed from the battery compartment and no external power source is present.

2. Initial Diagnostic State 1104

When DC power is applied, the service processor 264 makes the state transition 1112 to the initial diagnostic state 1104. This state is a transient state from zero power state 1102 when the on/off button 438 is pressed and power is supplied to the system planar 200 at the normal power state 1106. In the initial diagnostic state 1104, the service processor 264 performs certain diagnostics on the peripherals it controls. In particular, the service processor 264 ensures that the data and clock lines 1004, 1102 between it and the battery controller 1010 are not stuck in the low or high states.

3. Normal Power state 1106

When the results of the initial diagnostic tests indicate an operational system, the service processor 264 makes the state transition 1114 to the normal power state 1106. The service processor 264 is in this state as long as the system support chips 1012 have not asserted the full power down signal. In the normal power state 1106, the service processor 264 can respond to commands from the main processor 252 and continue to acquire power related data from the battery microcontroller 1010.

4. Idle state 1108

The service processor 264 makes the state transition from the normal power state 1106 to the idle power state 1108 when the full power down signal becomes active. This means that the main processor 252 has been shut down and most of the power planes in the system have been turned off. In this state, the service processor 264 stops executing instructions although its clock is still active. Before entering the idle power state 1108, the service processor 264 starts an internal timer which wakes up the service processor 264 periodically so it can get data from the battery controller 1010. If the service processor 264 determines a low battery condition during this time, it will transmit this signal to the on/off glue logic 266 over the LOW BATT signal line 402. The main processor and support chips 1012 may not come out of their standby state 502 while there is a low battery condition. If there is no low battery condition, depression of on/off button 438 will cause the RESUME signal to be active on the RESUME signal line 426. The main processor and support chips 1012 will exit their standby state 502, and this in turn will deactivate Full Power Down and will cause the service processor 264 to exit idle state 1108 and make the state transition 1118 back to the normal power state 1106.

5. Power Check State 1110

The service processor 264 makes a state transition 1120 to the power check state 1110 on a periodic basis. The power check state 1110 is a short-duration state during which the service processor 264 collects battery related data from the battery controller 1010 and then makes the state transition 1122 back to the idle power state 1108.

Service Processor Microcode Logic

Figure 12:
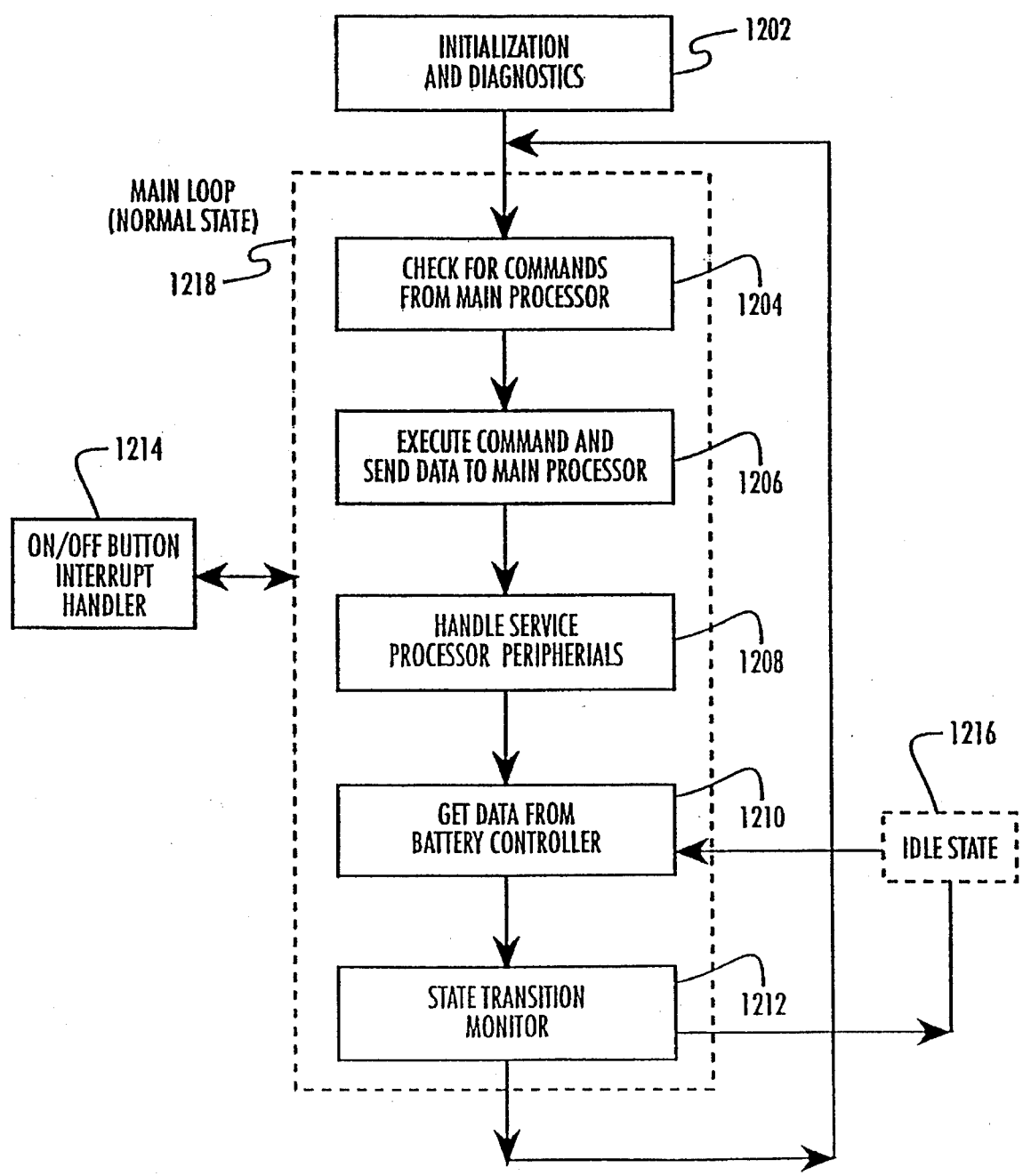
FIG. 12 is a flowchart of the service processor main loop processing.

FIG. 12 is a flowchart of the service processor microcode logic. Only the components of the service processor microcode that are relevant to power management are described. As discussed, the service processor controls many other peripherals in addition to the battery controller 1010. Referring to FIG. 12, the service processor 264 performs initialization of its internal variables and performs certain diagnostics when power is applied to it, step 1202. Subsequently, it enters the normal state's main loop 1218. In loop 1218 the service processor microcode first checks to see if the main processor 252 has sent it a command, step 1204. If so, the command is executed and data returned to the main processor 252, step 1206. In terms of power management, the main processor 252 may request any of the data identified above. The service processor 264 then handles pending communication with the peripherals that it controls, step 1208. It then examines whether the battery controller 1010 has data to send to it by allowing the clock line 1002 to float high, step 1210. When the battery controller 1010 senses that clock line 1002 is high, it begins a sequence of clock line signaling that culminates in the reception of battery related data by the service processor 264. After capturing data from the battery controller 1010, the service processor 264 examines the full power down signal line (−FULLPDN) 1020 to determine if it should enter the idle state 1108. If so, the state transition 1118 is made to the idle power state 1108 after a timer is set up. When the timer expires, the service processor 264 comes out its idle state 1108, toggles the Wakeup signal line 1006 to the battery controller 1010, receives battery data from it, monitors the full power down signal line 1020 and re-enters idle state 1108 if –FULLPDN is still active. Before the timer has expired, if the on/off button 438 is pressed, the on/off glue logic 266 will generate a RESUME signal directed to the main processor and support chips 1012. This in turn will cause –FULLPDN signal line to become inactive. This latter event causes the service processor 264 to exit the idle state 1108 and resume the main loop 1218 activities.

V. BATTERY CONTROLLER LEVEL

The battery controller 1010 performs the following functions: a) detecting when an external DC source is available and allowing battery charging if necessary, b) supplying power to the main processor 252, service processor 264 and certain other power planes when the on/off button 438 is pressed, and c) battery condition monitoring and alarm signal to service processor 264 as needed to prevent damage to the battery and to support graceful shutdown of the computer.

Battery Controller Hardware

Figure 13:
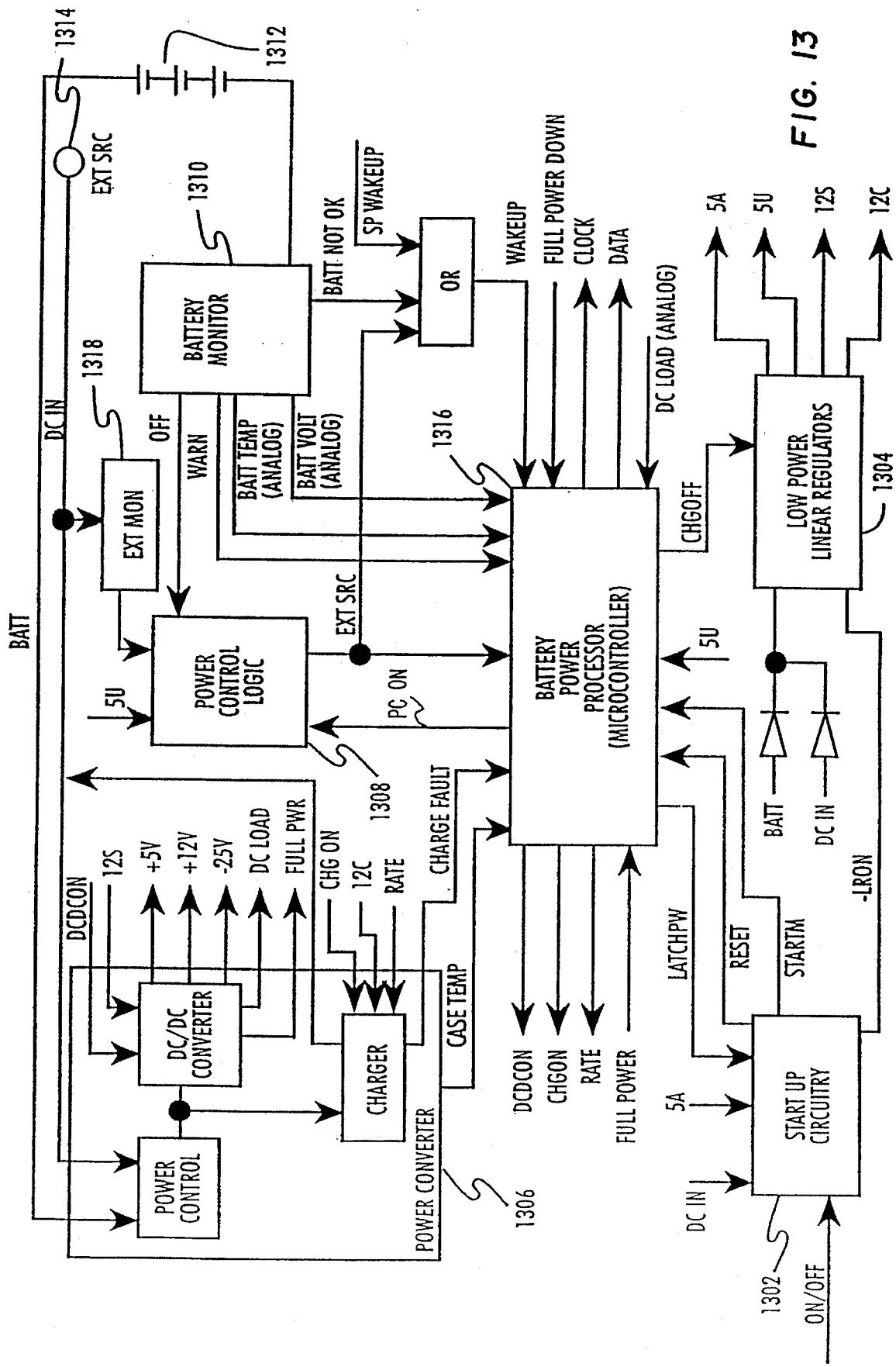
FIG. 13 is a block diagram of the battery controller.

FIG. 13 is a block diagram of the battery controller 1010 showing the major components and their interconnections. The main components are: (1) start up circuitry 1302 and power regulators 1304, (2) power converter assembly 1306, (4) power control logic 1308, and (5) battery monitor 1310, (6) the battery 1312, (7) external source 1314, and (8) the battery power processor or microcontroller 1316. Battery management is carried out in the preferred embodiment by an 8 bit microcontroller, the Signetics S83C752, as the battery power processor or microcontroller 1316, and several digital and analog discrete components. Each of the major components of the battery controller 1010 will now be discussed separately.

1. Start-up Circuitry 1302 and Power Regulators 1304

Figure 14:
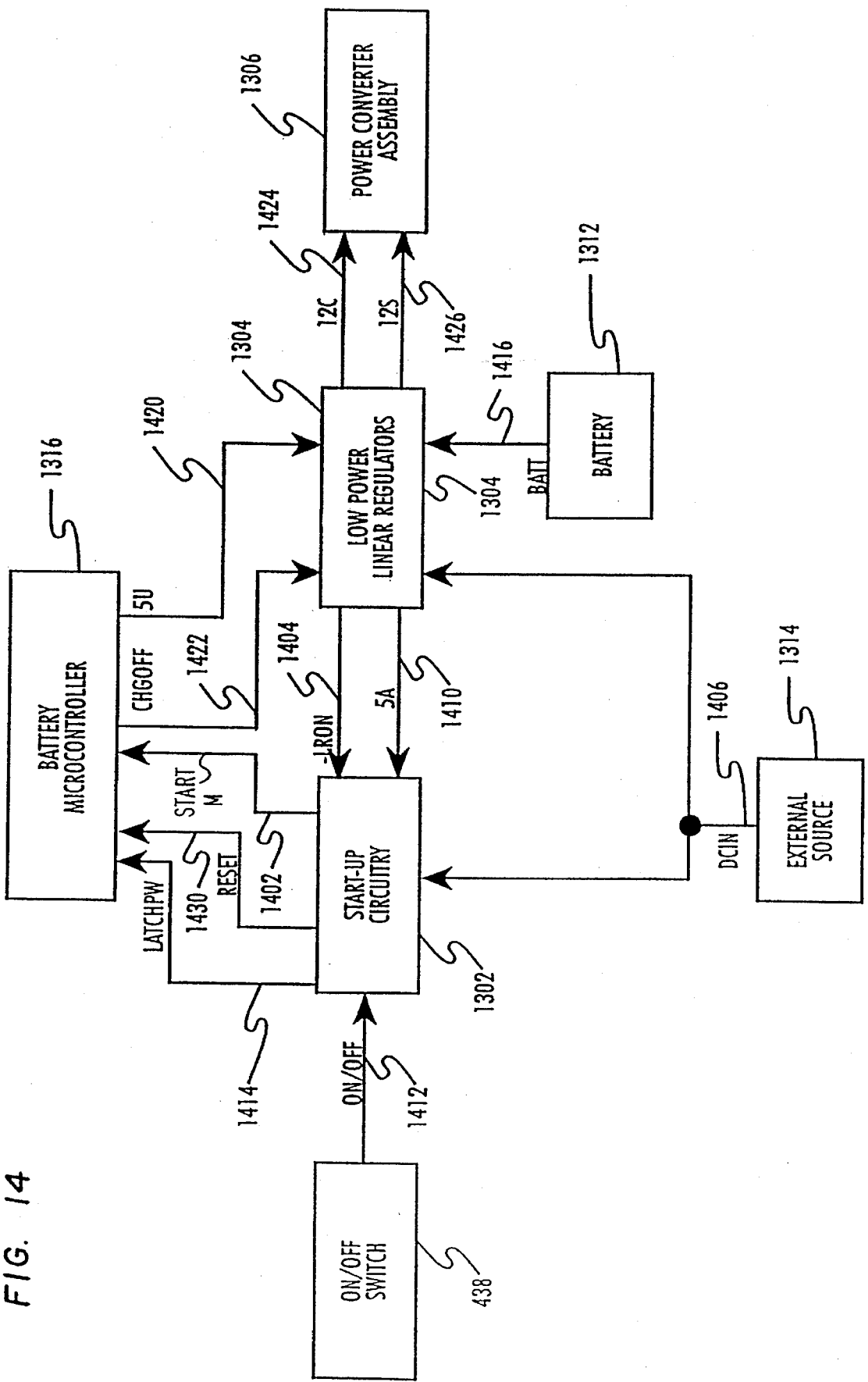
FIG. 14 is a block diagram for the start up circuitry and low power linear regulators of the battery controller.

Referring to FIG. 14, the start-up circuitry 1302 comprises two output signal lines. The STARTM output signal line 1402 is monitored by the battery microcontroller 1316 and the –LRON output signal line 1404 is monitored by the low power linear regulators 1304. The start up circuitry 1302 has a DC In input signal line 1406 which provides the DC In signal generated by the external power source 1314, a 5A input signal line 1410 generated by the low power linear regulators 1304, which provides the power on reset signal generated by the low power linear regulators 1304, the ON/OFF signal line 1412 which provides the state of the on/off button 438, and the LATCHPW input signal line 1414 which provides the power latch signal generated by the battery microcontroller 1316.

The start up circuitry 1302 outputs the start machine signal on the STARTM signal line 1402 whenever the on/off button 438 is pressed by the user and a power source (battery or external power) is present. The start up circuitry 1302 is notified of the presence of the battery 1312 or external source 1314 by monitoring the 5A signal line 1410 from the power regulators 1304. The linear power regulators 1304 receive the battery power on the BATT power line 1416 and the external power source on the EXT power line 1418. The linear power regulators 1304 output the power available signal on the 5A signal line 1410 to the start up circuitry 1302 to notify it of the presence of power.

The start up circuitry 1302 indicates when power has initially been introduced to the system by sending the linear regulators on signal on the –LRON signal line 1404. This indication occurs whenever the on/off button 438 is pressed, when an external DC power source 1314 is introduced, or when a fresh battery 1312 is inserted into the battery compartment. This signal is used by the linear regulators 1304 to generate the power on the 5U signal line 1420 for the power control logic 1308. The start up circuitry also generates the reset signal 1430 to the battery controller 1316 whenever an external source 1314 is introduced or a battery inserted and the microcontroller 1316 is in the zero power state 2002. The RESET signal is also generated when the on/off button 438 is pressed or an external source is introduced and the battery microcontroller is in the sleep state 2006. The battery microcontroller 1316 executes a special code fragment called Power-On-Reset whenever it is reset. This code fragment generates the latch power signal on the LATCHPW signal line 1414 to the start up circuitry 1302. This causes the start up circuitry 1302 to maintain the state of the –LRON output signal line active after the initial event (i.e., on/off button or DC In or battery insertion) has completed.

The low power linear regulators 1304 output the power source for the battery charger in the power converter assembly 1306. The 12C power output line 1424 is gated off when the linear power regulators 1304 receive the charge off signal on the CHGOFF signal line 1422, indicating when no external power source is present and that no charging activity should take place.

2. Power Converter Assembly 1306

Figure 15:
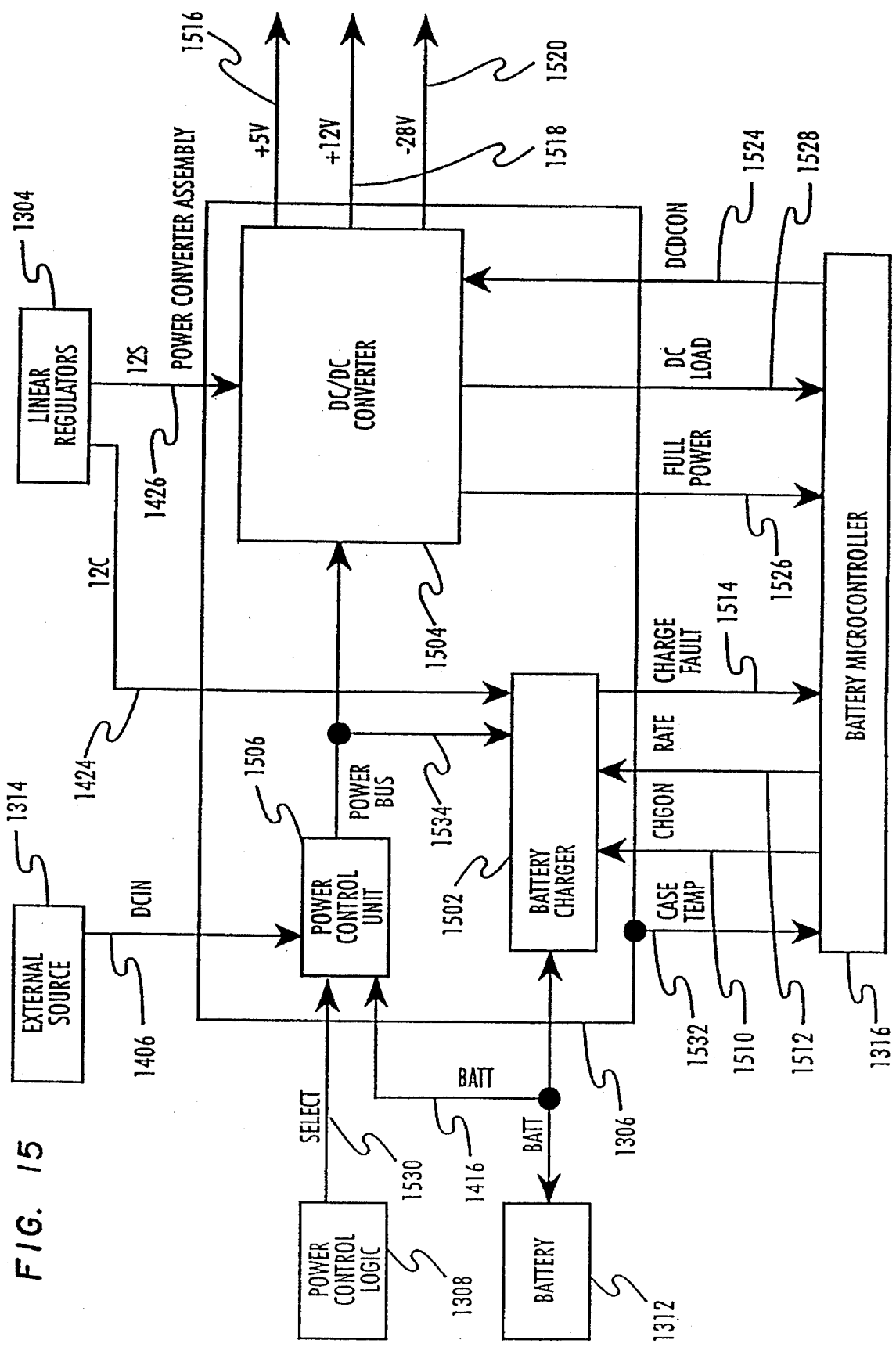
FIG. 15 is a block diagram of the battery controller power converter assembly of the battery controller.
Figure 16:
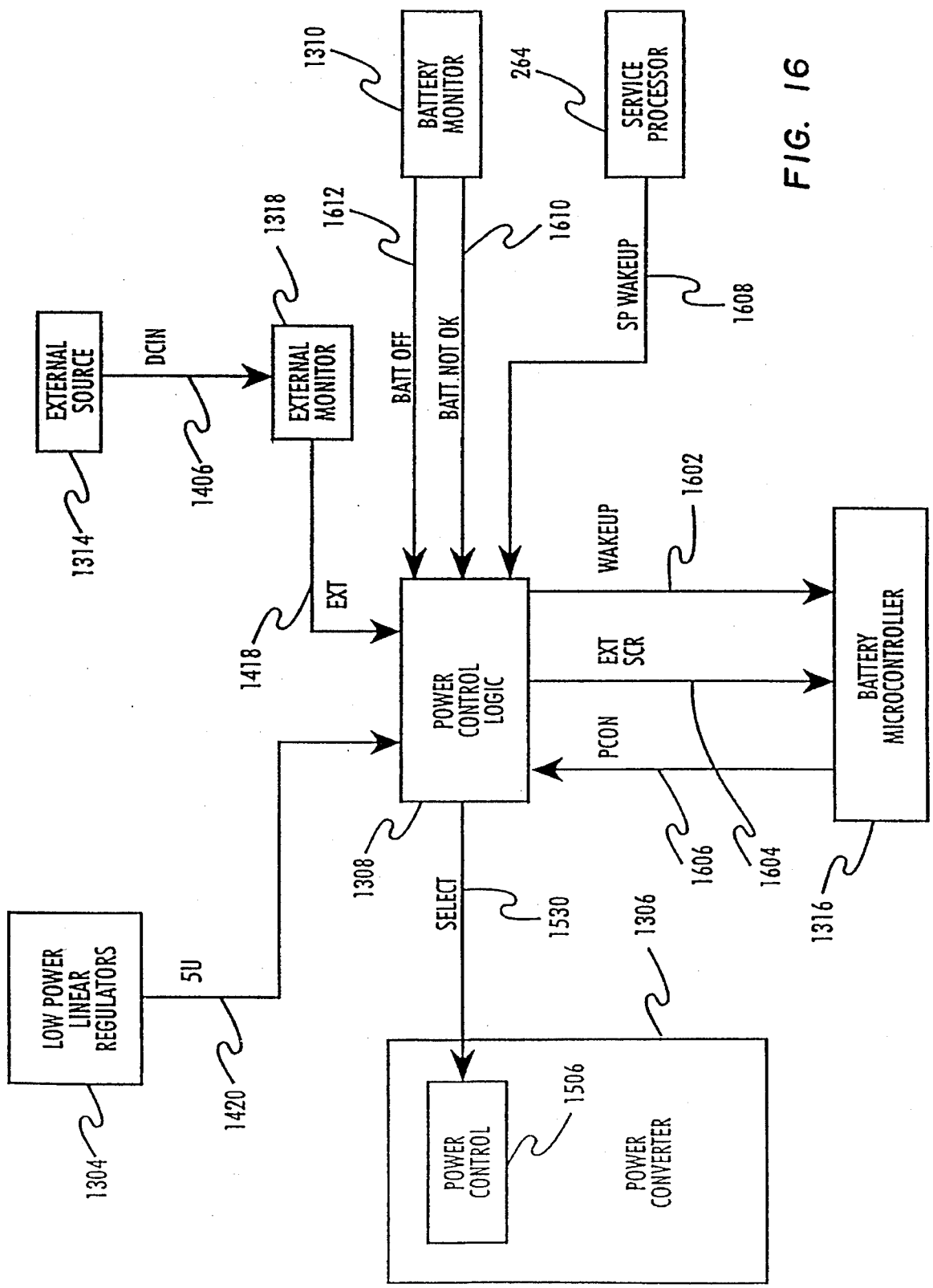
FIG. 16 is a block diagram for the power control logic of the battery controller.
Figure 17:
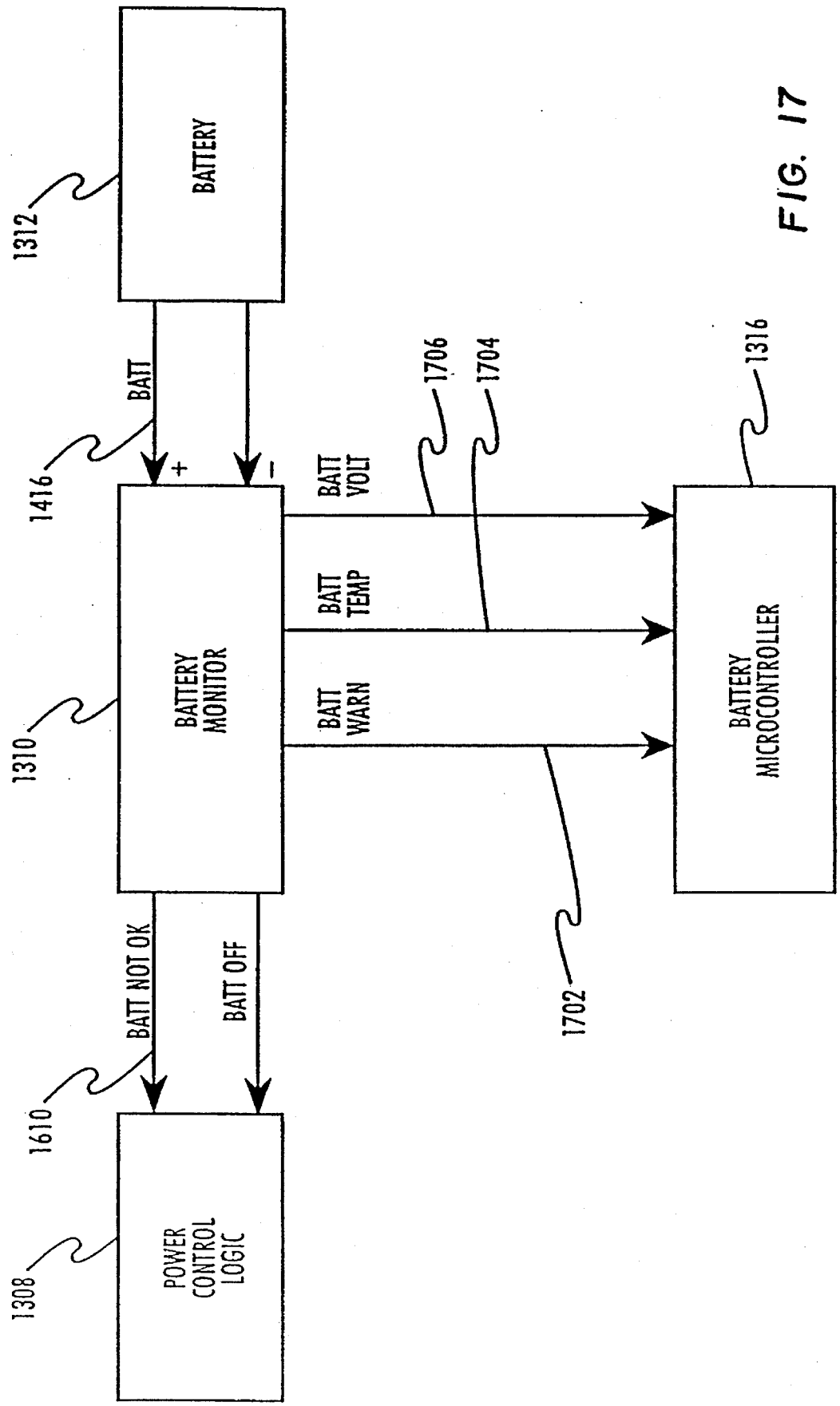
FIG. 17 is a block diagram for the battery monitor of the battery controller.

Referring to FIG. 15, the power converter assembly 1306 consists of the battery charger 1502, the DC/DC converter 1504, and the power control circuitry 1506. The power converter assembly 1306 receives three input signal lines for the battery charger 1502. The CHGON input signal line 1510 and the RATE input signal line originate at the battery microcontroller 1316. The battery charger 1502 receives the 12C input power line 1424 from the linear power regulators 1304. The battery microcontroller 1316 sends the battery charger 1502 a begin charging signal on the CHGON signal line 1510 to turn the battery charger 1502 on to start charging the battery. The battery microcontroller 1316 also sends the battery charger 1502 a charge rate on the RATE signal line 1512 to determine how much the battery charger 1502 will deliver to the battery 1312 per unit time over the battery charge line (BATT) 1508. The 12C line 1424 is the power source bias line for the battery charger 1502 and is output by the low power linear regulators 1304 and controlled by the battery microcontroller 1316. The power bus line 1534 from the power control unit 1506 supplies the actual power to the battery charger 1502 and to the DC/DC converter 1504.

The DC/DC converter 1504 generates a set of voltage levels required to operate the computer and associated peripherals. In the preferred embodiment, the DC/DC converter is comprised of three output voltage lines: the +5 v output voltage line 1516, the +12 v output voltage line 1518, and the –28 v output voltage line 1520. The operation of the DC/DC converter 1504 is controlled by the 12S input signal line 1426 which is output from the low power linear regulators 1304, and the DCDCON signal line 1524 which originates at the battery microcontroller 1316. The stable 12 volt source signal is transmitted over the 12S signal line 1426 to indicate when a stable power source (battery or external DC) is present. The DC/DC converter on signal is output by the battery microcontroller 1316 on the DCDCON signal line 1524 to turn on the DC/DC converter 1504 on.

The DC/DC converter 1504 is comprised of two output signal lines. The FULL PWR output signal line 1526 is monitored by the battery microcontroller 1316 in order to determine if the DC/DC converter 1504 is putting out full power to the computer. The DC Load output signal line 1528 is an analog line specifying the load on the converter. This line is converted by the battery microcontroller 1316 to a digital value before being passed on to the service processor 264.

The power control unit 1506 is used to select either the battery 1312 or the external source 1314. The power control unit 1506 has a SELECT input line 1530 which originates at the power control logic 1308. The power control unit 1506 selects the power source based on the signal generated by the power control logic 1308 on the SELECT input line 1530. The power control unit 1506 outputs the power bus line 1534 as the power source for the DC/DC converter 1504 and the battery charger 1502.

Power Control Logic 1308

The power control logic 1308 has a SELECT output signal line 1530 which is monitored by the power control circuitry 1506 to determine which power source to select. The power control logic 1308 outputs the source select signal on the SELECT signal line based on the power-on reset signal received on the 5U signal line 1420 and the EXT signal line 1418. The external monitor circuitry 1318 monitors the DC In power line 1406 generated by the external source 1314 and generates the external source available signal on the EXT signal line 1418 if the external source 1314 is sufficient to power the computer.

The power control logic 1308 provides a wakeup signal transmitted over the WakeUp signal line 1602 to the battery microcontroller 1302. The power control logic generates the wakeup signal to take the battery microcontroller 1316 from the standby to normal operational state. This signal is generated from one of three conditions: when the service processor 264 generates a wakeup signal on the SP wakeup signal line 1608, when the battery monitor 1310 generates a poor battery diagnostic signal on the Battery Not OK signal line 1610, or when the battery monitor 1310 generates an off command on the OFF signal line 1612 or when the external monitor circuitry 1318 detects an external source of sufficient power present and transmits such on the EXT signal line 1418.

Battery Monitor 1310

The battery monitor 1310 is responsible for producing signals representing the characteristics and status of the battery 1312. The battery monitor 1310 receives the battery voltage on the BATT power line 1416. Battery monitor 1310 generates two analog signals; a battery voltage on the BATT VOLT signal line 1706 and the battery temperature on the BATT TEMP signal line 1704. The battery monitor 1310 also generates the battery warning signal on the BATT WARN signal line 1702 and the battery off signal on the BATT OFF signal line 1612. The battery warning signal causes an interrupt to the battery microcontroller 1316 which can then inform the service processor 264. The battery off signal will cause power to the computer to be turned off.

Battery Microcontroller Firmware

The firmware executed by the preferred embodiment of the battery controller 1010 has the following major components: a) initialization routine, b) communication with service processor, c) DC/DC converter routines, d) battery charging routine, e) A/D service routine, and f) power down routine.

Figure 18:
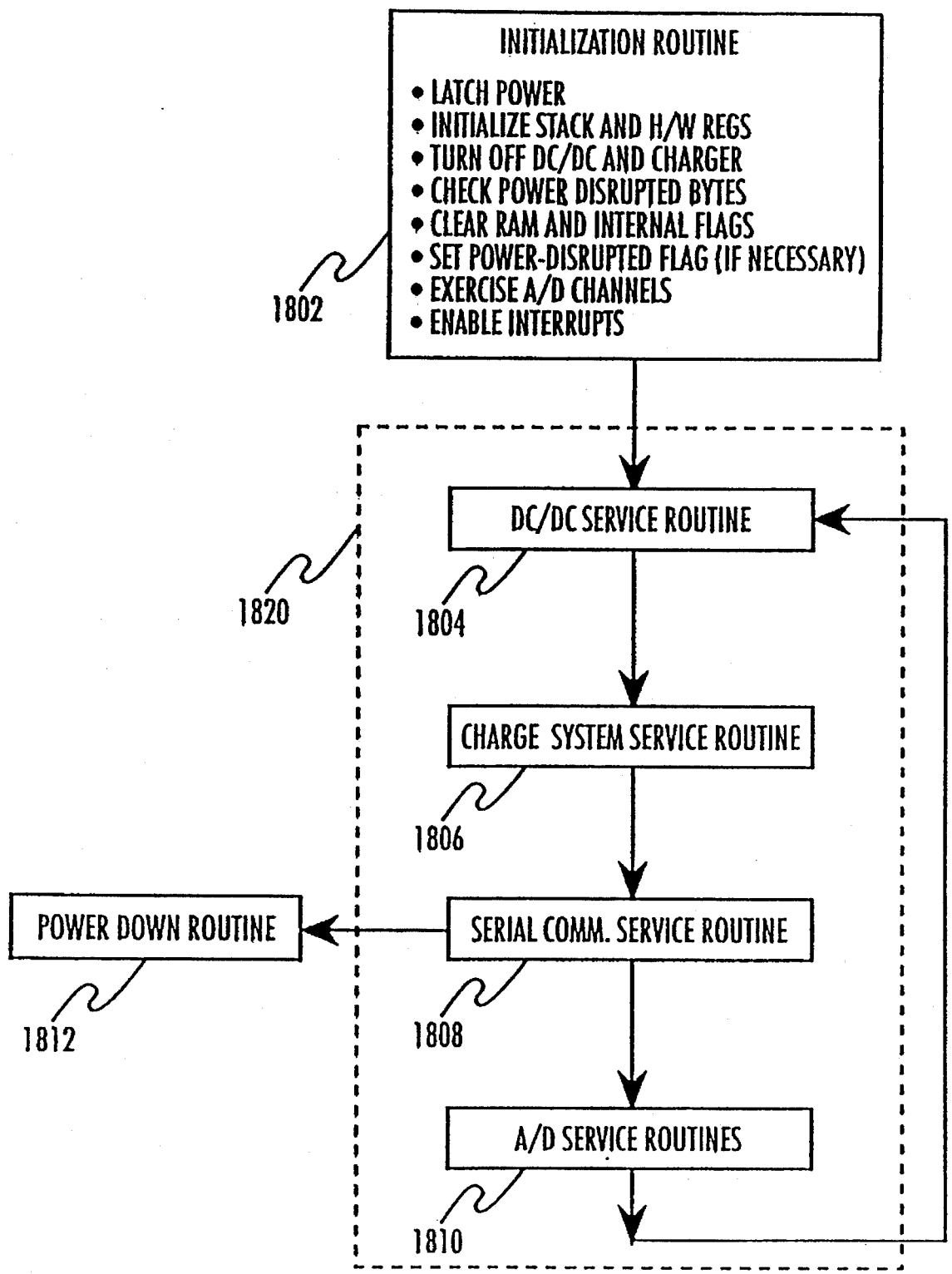
FIG. 18 is a flowchart of the main loop executed by the battery controller firmware.

FIG. 18 is a flowchart of the battery microcontroller firmware. Components (b), (c), (d) and (e) are executed in an endless loop 1820. What action it takes is determined by the state variables maintained by each of these code fragments and external events that may occur synchronously with their execution. Therefore, each of these routines may be considered to be the implementation of a state machine. Each of these routines are now described separately.

Initialization Routine 1802

The initialization routine 1802 is executed whenever the battery microcontroller 1316 receives a power-on-reset signal on the reset signal line 1430. This code fragment first generates the latch power signal on the LATCHPW signal line 1414. This signal ensures that the "linear regulators on" signal on the –LRON signal line 1404 continues to be active after the initial event (i.e., on/off button or EXT or battery insertion) has completed. The initialization routine 1802 then initializes its stack and internal registers, turns off the "DC/DC converter on" signal on the DCDCON signal line 1524 and "battery charger on" signal on the CHGON signal line 1510. It saves the state of the power disrupted bytes, and clears flags that control the state of DC/DC converter 1504 and battery charger 1502. If the saved power-disrupted bytes indicate that the battery 1312 may have been removed in the absence of an external source 1314 (i.e., the power-disrupted bytes don't match a pre-designed signature value), then the power-disrupted flag is set. Next, all A/D channels are exercised. Interrupts are then enabled. It then executes a series of routines in a cyclical fashion. The routines executed are: a) the DC/DC service routine (SDCDC), b) battery charge service routine (SCCHARGE) if external source is present (EXT), c) service processor communication service routine, d) A/D sampling routines.

DC/DC Routine 1804

The DC/DC routine 1804 implements a finite state machine using a state variable called DSYSSTAT and certain delays. The state variable allows the DC/DC routine to "remember" the state when the DC/DC routine is executed in the endless loop 1820. DSYSSTAT is initialized to 0 by the initialization routine 1802. In state 0, if the on/off button 438 has been pressed causing the start machine signal on the STARTM signal line to be is active, the PC-on signal on the PCON signal line 1606 is activated and DSYSSTAT is incremented. If on/off button 438 is not pressed and an external source 1314 is not present, the standby power state is entered. The power control logic 1506 monitors the PC-on signal on PCON signal line to generate the source select signal on the SELECT signal line 1530. In state 1, DCDCON signal line 1524 is activated and system state DSYSSTAT is incremented to state 2. DCDCON signal line 1524 is used by the DC/DC converter 1504 to supply power to the rest of the computer. In state 3, this routine essentially monitors external events that might take place such as: full power down event that signals that the main processor 252 is shutting down or DC/DC is not supplying full power. If full power down occurs, the routine enters state 4. In state 4, after some delay, the battery microcontroller 1316 enters idle state if there is no external DC source 1314. The idle state is exited due to any number of reasons outlined below. If there is an external DC source 1314, the idle state is not entered; rather state 4 is repeated until full power down becomes inactive. Eventually, the main computer will deactivate full power down signal at which point, the state variable is reset to 3.

Charge System Service Routine 1806

The charge system service routine 1806 is executed only if external power source 1314 is present, if the ambient temperature generated by the power converter 1306 on the Case Temp signal line 1532 and the battery temperature generated by the battery monitor 1310 on the BATT TEMP signal line 1704 are within prescribed limits, and if the battery voltage signal generated by the battery monitor 1310 on the BATT VOLT signal line 1706 is within limits. If all these conditions are met, a charge rate is then computed based on the current load (in watts) presented by the planar. If the load is high, the charge rate is correspondingly set to low. If the load is low, the charge rate is set too high. Using the charge rate signal received on the RATE signal line 1512, the battery charger 1502 supplies energy to the battery 1312.

A/D (analog-to-digital) Service Routines 1810

The A/D service routines 1810 consists of two parts: an A/D conversion interrupt handler which collects sampled data and a background service routine which filters the data. A/D activity is initiated at periodic intervals (33 milliseconds in the preferred embodiment) using a free standing timer as the time base. Five analog items are sampled and converted in sequence: The battery voltage (BATT VOLT) signal line 1706, the external source voltage (DCIN) signal line 1406, the system load on the DC load line 1528, battery temperature on the BATT TEMP line 1704, and ambient case temperature on the CASE TEMP 1532. Each conversion takes about 80 microseconds and causes an interrupt. The interrupt service routine captures the data and sums it to a running total. The background service routine then determines the average by shifting the sample total by n after 2\*\*n samples have been collected.

Serial Communications Service Processor 1808

The serial communications service routine 1808 controls the communication to and from the service processor 264. This is controlled by the battery microcontroller 1316 via two lines—a clock line 1320 and data line 1322. Normally, the lines are pulled high by external circuitry. If the service processor 264 wishes to inhibit communication, it can do so by pulling the clock line low. As long as the clock line is low, no data transmission is attempted by the battery microcontroller 1316. When the service processor wishes to receive data, it allows the clock line 1320 and data line 1322 to be pulled high by external circuitry. When the service processor 264 wishes to send a command to the battery microcontroller 1316, it pulls the data line low. The battery microcontroller 1316 responds by pulling the clock line 1320 low, sampling the data line 1322 and then setting the clock line 1320 high again. This is repeated until 8 bits of data are accumulated. The 8-bit data byte is then interpreted as a command byte. The following commands are recognized in the preferred embodiment:

1. Turn power off

This command indicates that power to the system planar 200 can be turned off. The battery microcontroller 1316 responds to this command by first checking if external power source 1314 is available. If it is present, then power to system planar 200 is turned off and the battery microcontroller 1316 remains in the normal power state. If external power 1314 is not present and the power disrupted flag is clear, then signature bytes are written and then power down routine is executed. This routine will turn power off to the main computer 252 and place the battery microcontroller 1316 in standby state by executing a halt instruction.

2. Clear power disrupted flag

This command clears the battery-disrupted flag. This flag is set whenever the battery microcontroller 1316 detects that the signature bytes written prior to entry into standby state have been corrupted. The battery microcontroller 1316 examines the signature byte whenever it makes a state transition from standby state to normal power state.

3. Clear charge fault

This command clears the charge fault flag. This flag is set whenever the battery processor 1316 detects a fault in the charging system.

4. Set charge fault

This flag is set whenever the battery processor 1316 detects a fault in the charging system.

Figure 19:
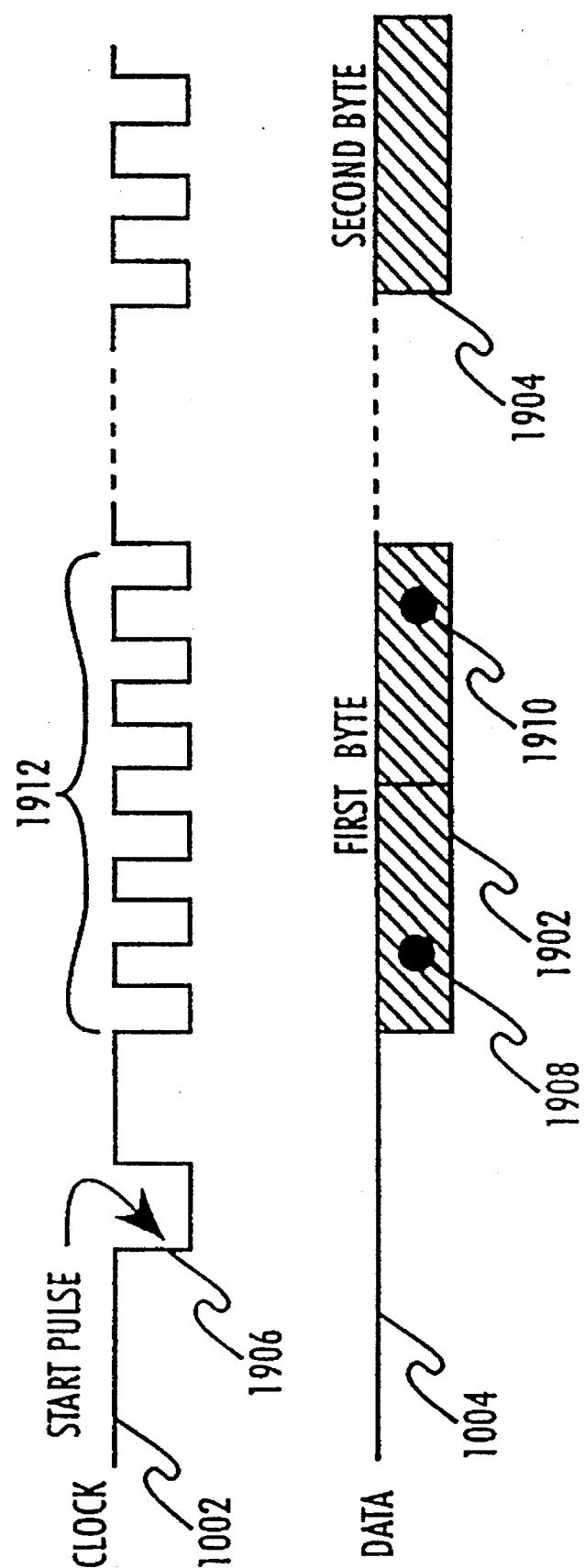
FIG. 19 is the data transmission protocol between the battery controller and the service processor.

At regular intervals in the normal power state, the battery controller 1010 will attempt to send power status bytes to the service processor 264. The protocol between the battery microcontroller 1316 and the service processor 264 is given in FIG. 19. As mentioned above, data can be sent only when the clock and data lines 1002, 1004 are high. When this condition is met, the battery processor will initiate a sequence of clock pulses 1912 to clock in the data on data line 1004. Data is transmitted from the battery processor 1316 to the service processor 264 in two byte packages 1902 and 1904. Each package is preceded by a single start pulse 1906 on the clock line 1002 as shown. The lower nibble 1908 of the first byte 1902 in the package indicates which data byte is being sent, the higher nibble 1910 is a checksum nibble. The second byte 1904 is the data. In the preferred embodiment, the second byte may contain the following data bytes: Battery voltage data byte, DC load data byte, Battery temperature data byte, ambient temperature data byte, and status data byte.

Power Down Routine 1812

The power down routine 1812 is executed upon receipt of a command from the service processor 264 to turn computer power off or when the battery charge drops below a threshold value. This routine a) disables all interrupts, b) turns off the charger, c) ensures that on/off button 438 is released, d) after a delay, pull down LATCHPW signal line 1414 that eventually turns off the DC/DC converter 1504 and e) execute a halt instruction. This places the battery microcontroller 1316 in the standby state which is the lowest power-consuming state. Exit from this state causes the battery microcontroller 1316 to execute the initialization routine 1802.

Power States of Battery Microcontroller

Figure 20:
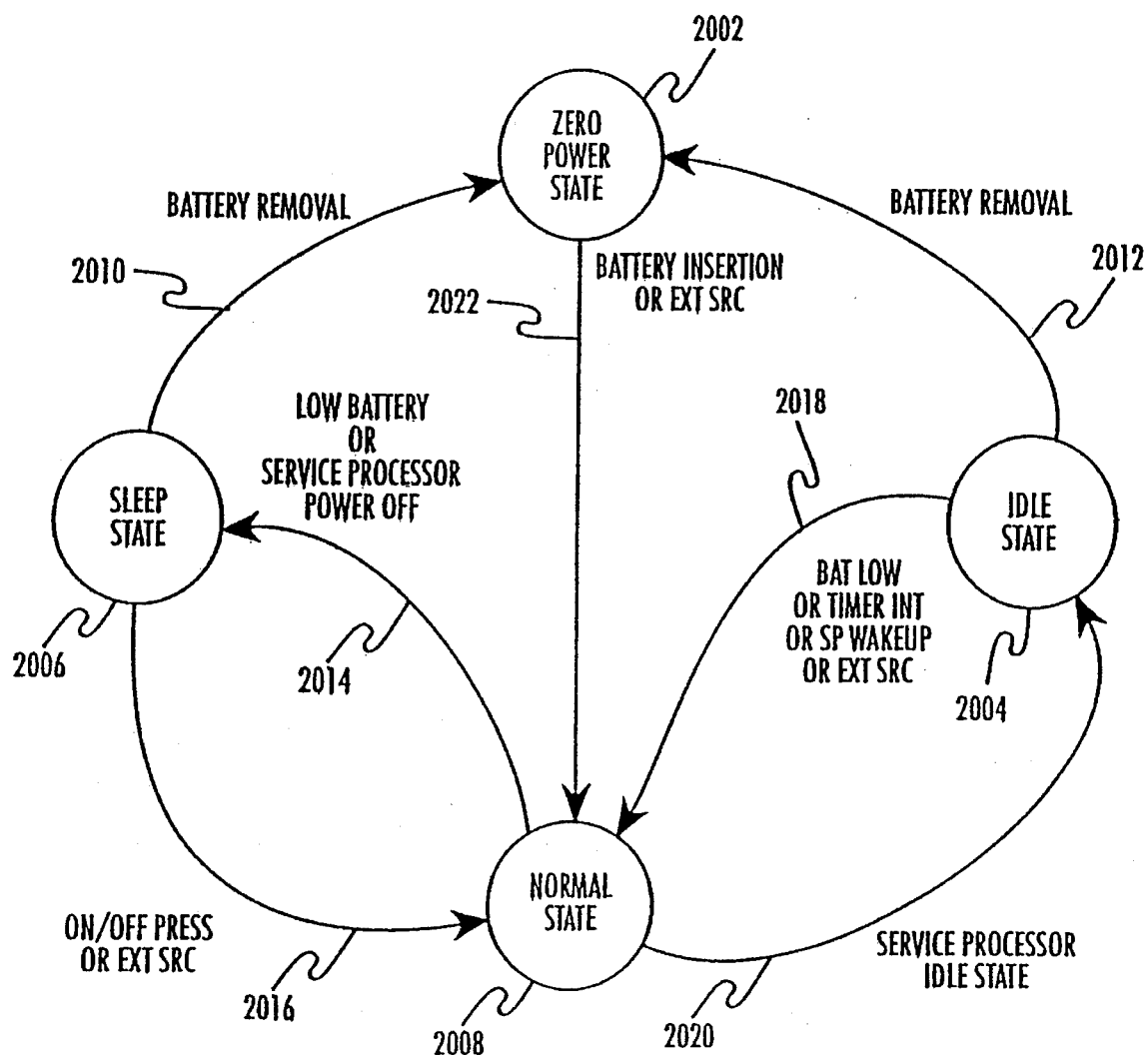
FIG. 20 is a state diagram of the battery microcontroller.

The battery microcontroller 1316 has distinct states corresponding to the amount of power used by the battery management hardware and software. The power states and actions that permit transitions between them form a finite state machine as shown in FIG. 20. The states and transitions are described below.

Transition 2022: Zero Power 2002 to Normal Power 2008

When no DC source is present in the system (external 1314 or battery 1312), the battery microcontroller 1316 is in the zero power state 2002. When a battery 1312 is inserted or an external DC source 1314 is introduced, the battery microcontroller 1316 makes state transition 2022 from the zero power state 2002 to the normal power state 2008. The battery microcontroller 1316 then executes the initialization routine 1802. The initialization routine 1802 then exits to the main loop 1820. The DC/DC service routine 1804 detects that the on/off button 438 is not being pressed and, depending on whether battery 1312 was inserted or external DC source 1314 was introduced, battery microcontroller 1316 either enters the standby state 2006 (very low power state to save battery drain) or stays in the normal state 2008 and exits the DC/DC service routine 1804 to the charge system service routine 1806.

Transition 2014: Normal State 2008 to Sleep State 2006

If state transition 2022 from zero power state 2002 to normal power state 2008 took place due to the insertion of a battery 1312 and no on/off button 438 was pressed, the battery microcontroller 1316 immediately makes the state transition 2014 and enters the sleep state 2006. The sleep state 2006 is also entered from the normal state 2008 upon receipt of a command from the service processor 264 to turn power off provided no external source 1316 is present. The sleep state 2006 is also entered if the battery charge is below a threshold. Before entering the sleep state 2006, the battery microcontroller 1316 ensures that no power is supplied to the main computer 252 or the service processor 264 (i.e., DC/DC converter 1504 is switched off) and the charging system is turned off. If an external source 1314 is present, the battery microcontroller 1316 never leaves normal state 2008 under any conditions. In the preferred embodiment, sleep state 2006 is entered when the battery microcontroller 1316 executes a halt instruction. In this state, contents of DRAM associated with the battery controller 1010 are preserved.

Transition 2010: Sleep State 2006 to Zero Power State 2002

If the battery 1314 is removed from the battery compartment while the battery microcontroller 1316 is in the sleep state 2006, the battery microcontroller 1316 will immediately make the state transition 2010 and enter the zero power state 2002. The DRAM will lose power and corrupt the contents of the signature byte. When the power source is later inserted, the power-disrupted flag will be set and communicated to the service processor 264.

Transition 2016: Sleep State 2006 to Normal State 2008

The battery microcontroller 1316 makes the state transition 2016 from sleep state 2006 to normal state 2008 when the on/off button 438 is pressed or an external DC source 1314 is introduced into the system. In the case of the latter, after making state transition 2016, the battery microcontroller 1316 stays in the normal state 2008 without turning on the DC/DC converter 1504. Charging of the battery 1312 (if present) may be initiated based on the battery charging algorithm. In the former case, (i.e., on/off button pressed), the DC/DC converter 1504 is turned on and power is supplied to the main computer 252 and to the service processor 264.

Transition 2020: Normal State 2008 to Idle State 2004

The battery microcontroller 1316 may make the state transition 2020 to idle state 2004 upon the activation of the full power down signal indicating that the main processor 252 has been shutdown and most other power planes have also been shutdown. The service processor 264 also enters the idle state 1208 upon receipt of this signal.

Transition 2018: Idle State 2004 to Normal State 2018

Periodically, the battery microcontroller 1316 leaves the idle state 2004 and enters the normal state 2008 to process interrupts that signal A/D conversions. These A/D conversions collect a number of data elements that collectively monitor the condition of the battery, load on the system and the ambient temperature. The system may also enter the normal state 2008 upon a wakeup signal from the service processor 264 received on the SP WakeUp signal line 1608 or when an external source 1314 is introduced or when battery is nearing a low charge level. When the battery charge is below a threshold, the battery microcontroller 1316 eventually transitions to the sleep state 2006.

Transition 2012: Idle State 2004 to zero Power state 2002

If the battery 1314 is removed while in idle state 2004, the system will make state transition 2012 and enter the zero power state 2002 until a source of power (battery 1312 or external DC source 1314) is inserted.

USER INTERFACE

The user of the system perceives only two states of the computer: ON and OFF. In the ON state, the user perceives that he can interact with the system. In the OFF state, the user perceives that he cannot interact with the system. In order to allow the user to control transition from the OFF state to the ON state and vice versa, the computer is provided with a single ON/OFF button 438. Pressing the button when the system appears OFF will cause the system to go to the user perceived ON state. Pressing the button when the system appears ON will cause the system to go to the user perceived OFF state. Behind these two perceived states, the processors cycle through the power states mentioned above.

The on/off button 438 plays a central role in the power state transition of the main processor 252, the system planar 200, the Service Processor 264, and the Battery Controller 1010. It is also the most basic and direct interface between the end-user and the computer. The on/off button 438 presents a simple, two-state interface to a multiple processor, multistate operation of the computer. Through the use of the on/off button 438, the user can turn the computer on when he perceives it to be off and he can turn it off when he perceives it to be on.

The power states of main processor 252, the service processor 264, and the battery controller 1010 do not correspond to this simple perception held by the user. When the user perceives the computer to be on, the main processor 252 may be in the idle state 504 with one or more of the power planes on the system turned off. Similarly, when the computer is perceived to be off, the processors may in fact be in the idle states 504, 1208, 1904, ready to go to normal power state instantaneously when the on/off button 438 is pressed again.

Figure 21:
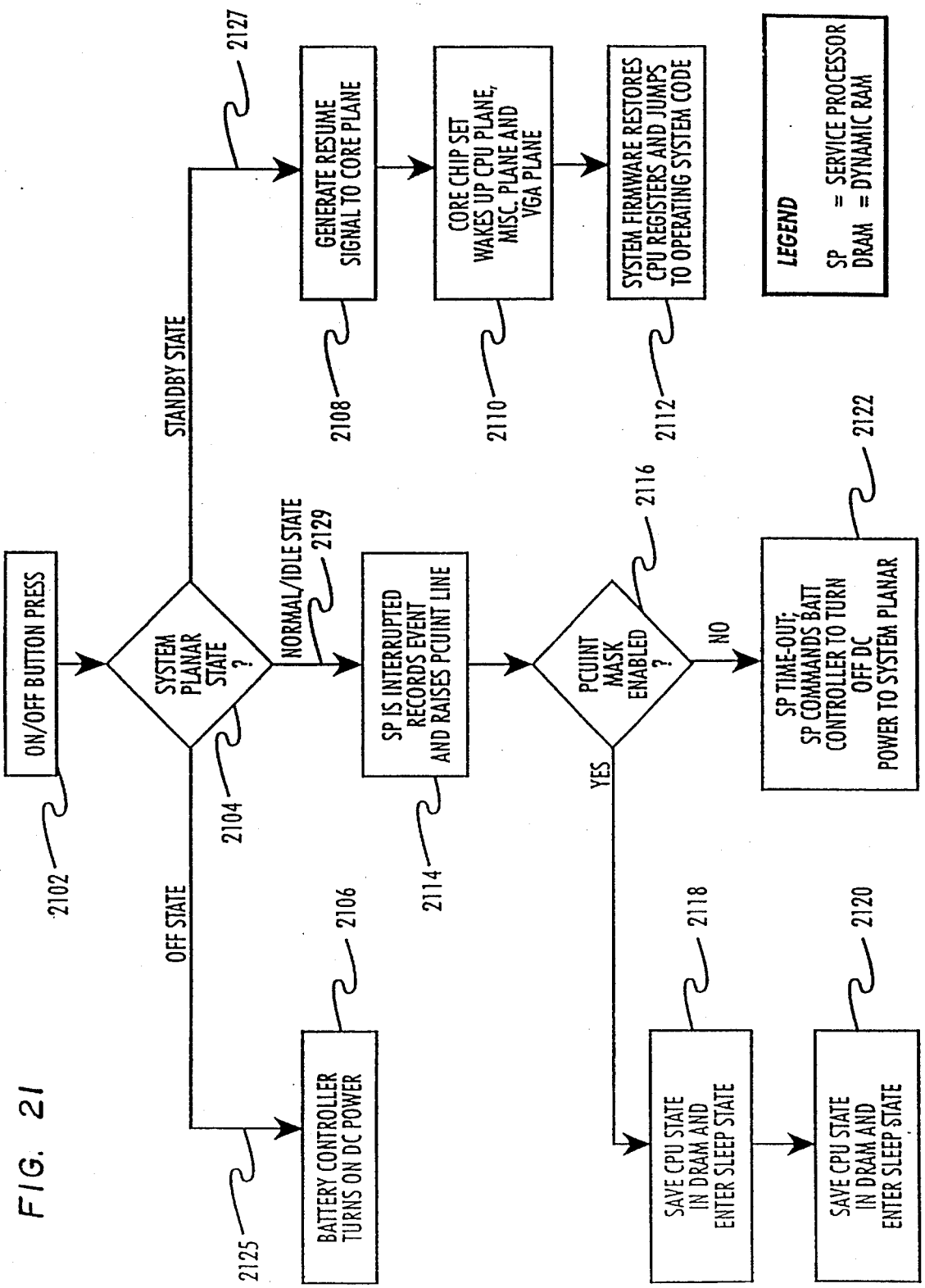
FIG. 21 is a flowchart of the on/off button logic.

The operation of the on/off button 438 is now described with reference to FIG. 21. When the on/off button 438 is pressed, step 2102, the state of the system planar 200, step 2104, will determine which functions are performed. When the system planar 200 is in the off power state 506, branch 2125 is executed, and the start machine signal is transmitted to the battery controller 1010. This starts a chain of events within the battery controller 1010 that results in power being supplied to the system planar 200, step 2106. If the system planar is in the standby state 502 as determined by step 2104, branch 2127 is executed, and the core planar 206 (which is powered on in this state) generates a RESUME signal, step 2108, that then causes the core chip set to turn on power to the main processor plane 208, the miscellaneous plane 206 and optionally the VGA support plane 210, step 2110. This results in the system planar 200 to be in the normal power state 508. The firmware and operating system software in the main processor 252 will restore the contents of the display screen which is perceived by the user as the "computer having turned on", step 412.

If the on/off button 438 is pressed when the system planar 200 is in normal power state 508 or idle power state 504, branch 2129 is executed, triggering an interrupt to the service processor 264, step 2114. The service processor 264 then generates a PCUINT signal that triggers a PM interrupt to the main processor 252, step 2114. The main processor 252 then determines that the on/off button 438 was pressed and prepares to enter the standby state 502. Among other thing, the main processor 252 places the VGA controller chip in low power mode, thus supporting the user perception that the computer has "turned off". While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. A method for monitoring, collecting and acting upon power-related data in a portable computer including a main processor having a first set of multiple operational states, said main processor controlling a plurality of independently controllable power planes, a service processor coupled to the main processor, said service processor having a second set of multiple operational states and configured to manage peripheral devices, and a battery microcontroller coupled to the service processor, said battery microcontroller having a third set of multiple operational states and configured to manage power input from one or more power sources, the method comprising the steps of:

a) determining power consumption for each of the plurality of independently controllable power planes for each of said first set of multiple operational states;

b) transitioning the main processor from a first zero power state to a first normal power state upon user activation of an on/off switch;

c) immediately transitioning the main processor to a first idle power state when the main processor has completed all necessary processing functions which require the main processor to remain fully powered and operational;

d) transitioning the main processor to a first standby power state when there is no processing activity for a first time duration while the main processor is in said first idle power state; and e) transitioning the main processor to a first zero power state upon expiration of a second time duration while the main processor is in a first standby power state, thereby removing power from the portable computer except for the battery microcontroller.

2. The method of claim 1, wherein said step b) comprises the steps of:

1) restoring application program states and applications program data; and 2) refreshing a user interface to a state which is equivalent to said user interface prior to said main processor entering said first zero power state.

3. The method of claim 1, wherein said step d) comprises the steps of:

1) automatically saving a application program state and said application program data in a secondary storage medium;

2) providing power to only those system components which are necessary to preserve data; and 3) placing a VGA controller in a low-power mode of operation, wherein said VGA controller permits refreshing of a video memory at a reduced rate.

4. The method of claim 1, wherein said step d) comprises the steps of:

1) reducing a clock speed of the main processor; and 2) turning off an LCD backlight part of a user interface when the main processor has remained in a first idle power state continuously for a predetermined amount of time.

5. The method of claim 1, further comprising the steps of:

g) transitioning the service processor to a second zero power state when all power is removed by the battery microcontroller and when the power sources are removed from the portable computer, wherein the service processor does not receive power;

h) transitioning the service processor through an initial diagnostic power state when power is applied by said user activation of said on/off switch with one of said one or more power sources available, wherein the service processor performs a diagnostic check on the peripheral devices;

i) transitioning the service processor to a second normal power state when said diagnostic check indicates the portable computer is operational, wherein said service processor responds to commands from said main processor and acquires the power-related data from said battery microcontroller;

j) transitioning the service processor to a second idle power state when power has been removed from the main processor, wherein said service processor ceases executing instructions while maintaining only a service processor clock, and further wherein the service processor periodically executes instructions to receive data from the battery microcontroller to determine if power has been restored to the main processor; and k) periodically transitioning the service processor to a power check state from said second idle power state, wherein said service processor monitors said battery microcontroller to receive status data regarding said one or more power sources.

6. The method of claim 1, further comprising the steps of:

g) transitioning the battery microcontroller from a third zero power state to a third normal power state when one of said one or more power sources is applied to the portable computer, wherein the battery microcontroller detects the position of said on/off switch and the type of said applied power source;

h) transitioning the battery microcontroller to a third idle power state to consume minimal power;

I) immediately transitioning said battery microcontroller to a third standby power state to consume a minimum amount of power when said on/off switch is off and said applied power source is a battery, wherein the battery microcontroller maintains data in a dynamic RAM and monitors said on/off switch; and j) transitioning said battery microcontroller to a third zero power state when none of said one or more power sources are present.

* * * * *